US011301692B2

(12) United States Patent
Oami

(10) Patent No.: US 11,301,692 B2
(45) Date of Patent: Apr. 12, 2022

(54) INFORMATION PROCESSING APPARATUS, CONTROL METHOD, AND PROGRAM

(71) Applicant: NEC Corporation, Tokyo (JP)

(72) Inventor: Ryoma Oami, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/626,756

(22) PCT Filed: May 18, 2018

(86) PCT No.: PCT/JP2018/019304
§ 371 (c)(1),
(2) Date: Dec. 26, 2019

(87) PCT Pub. No.: WO2019/003709
PCT Pub. Date: Jan. 3, 2019

(65) Prior Publication Data
US 2020/0134323 A1    Apr. 30, 2020

(30) Foreign Application Priority Data

Jun. 30, 2017  (JP) .............................. JP2017-129221

(51) Int. Cl.
*G06K 9/00* (2006.01)
*G06T 7/70* (2017.01)
*G06T 7/20* (2017.01)

(52) U.S. Cl.
CPC ..... *G06K 9/00778* (2013.01); *G06K 9/00342* (2013.01); *G06T 7/20* (2013.01);
(Continued)

(58) Field of Classification Search
CPC ........... G06K 9/00342; G06K 9/00778; G06K 9/00369; G06T 2207/10016;
(Continued)

(56) References Cited

U.S. PATENT DOCUMENTS 10,185,965 B2 * 1/2019 Matsumoto ........ G06Q 30/0201
10,339,544 B2 * 7/2019 Klima .................... G06Q 10/06
(Continued)

FOREIGN PATENT DOCUMENTS

JP    2007-272733 A    10/2007
JP    2008-519567 A    6/2008
(Continued)

OTHER PUBLICATIONS

International Search Report for PCT Application No. PCT/JP2018/019304, dated Jul. 31, 2018.
(Continued)

*Primary Examiner* — Tom Y Lu
(74) *Attorney, Agent, or Firm* — Sughrue Mion, PLLC

(57) ABSTRACT

An information processing apparatus detects an object queue from a video frame and generates tracking information indicating a position of each tracking target object, where each object included in the object queue is the tracking target object. The information processing apparatus generates queue behavior information related to a behavior of the object queue at a first time point using the tracking information at the first time point. The information processing apparatus computes an estimated position of each tracking target object at a second time point later than the first time point based on the tracking information and the queue behavior information at the first time point. The information processing apparatus updates the tracking information based on the position of each object detected from the video frame at the second time point and the estimated position of each tracking target object at the second time point.

17 Claims, 14 Drawing Sheets

(52) U.S. Cl.
CPC ...... *G06T 7/70* (2017.01); *G06T 2207/10016* (2013.01); *G06T 2207/30196* (2013.01)

(58) Field of Classification Search
CPC ... G06T 2207/30196; G06T 7/20; G06T 7/70; G06T 2207/30232; G06T 2207/30241; H04N 5/232; H04N 7/18
See application file for complete search history.

(56) References Cited

U.S. PATENT DOCUMENTS

| | | | |
|---|---|---|---|
| 10,614,317 B2 * | 4/2020 | Oami | H04N 7/18 |
| 2008/0312871 A1 | 12/2008 | Salcedo | |
| 2014/0301602 A1 * | 10/2014 | Raja | G06Q 10/0631 |
| | | | 382/103 |
| 2015/0032556 A1 * | 1/2015 | Evans | G06K 9/00778 |
| | | | 705/16 |

FOREIGN PATENT DOCUMENTS

| | | |
|---|---|---|
| JP | 2010-130383 A | 6/2010 |
| WO | 2017/047060 A1 | 3/2017 |

OTHER PUBLICATIONS

Japanese Office Action for JP Application No. 2021-038064 dated Feb. 22, 2022 with English Translation.

* cited by examiner

| TRACKING ID | POSITION | STATE | MOTION | FEATURE VALUE | REGION |
|---|---|---|---|---|---|
| id0001 | (x11, y11) | STAND-STILL | – | f11, f12 | TL=(x12, y12) BR=(x13, y13) |
| id0002 | (x21, y21) | STAND-STILL | – | f21, f22 | TL=(x22, y22) BR=(x23, y23) |
| id0003 | (x31, y31) | MOVEMENT | p31, p32 | f31, f32 | TL=(x32, y32) BR=(x33, y33) |
| id0004 | (x41, y41) | MOVEMENT | p41, p42 | f41, f42 | TL=(x42, y42) BR=(x43, y43) |
| ... | ... | ... | ... | ... | ... |

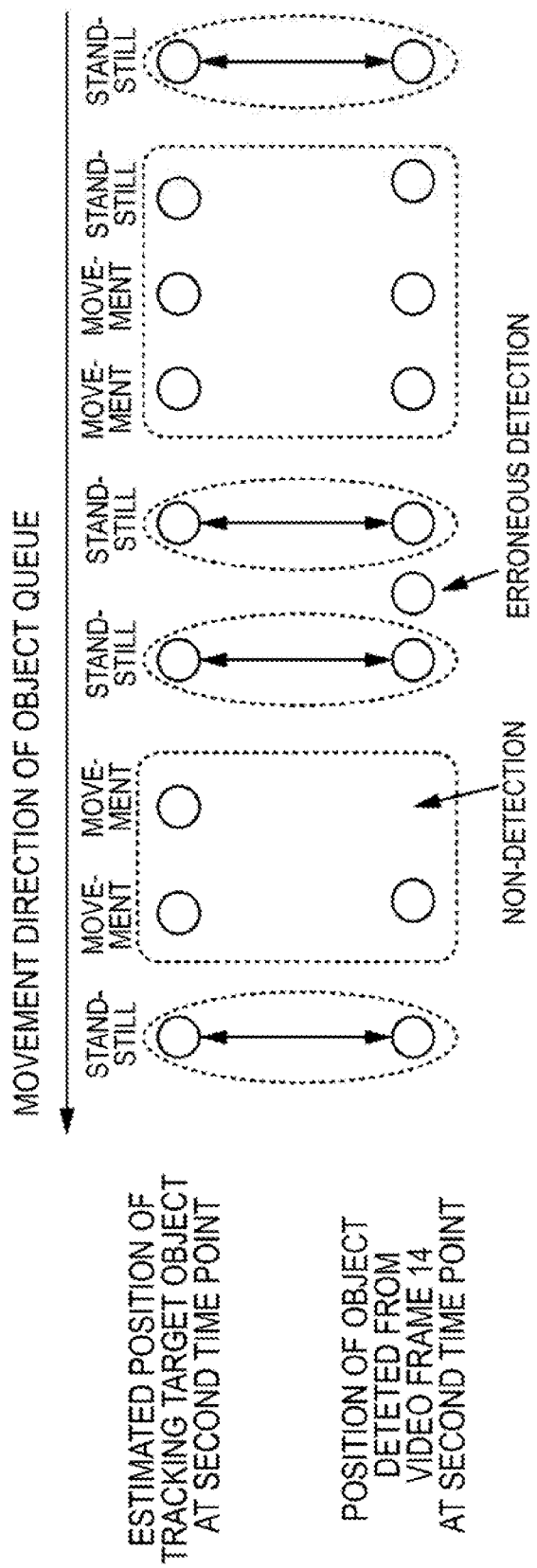

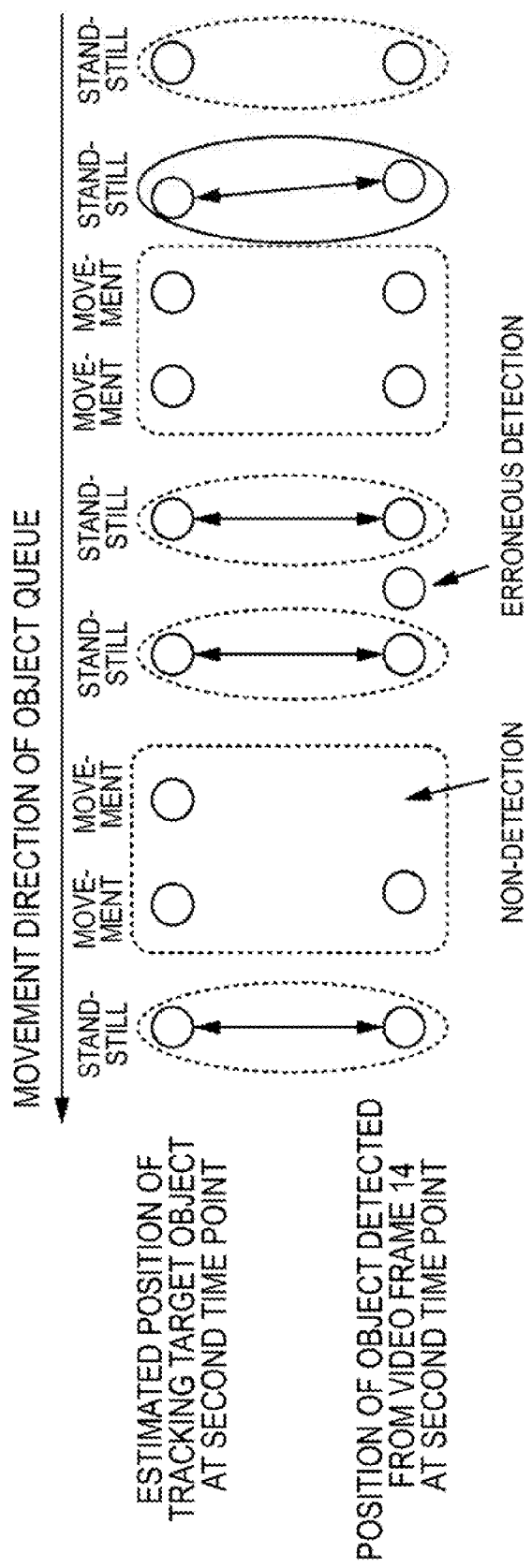

INFORMATION PROCESSING APPARATUS, CONTROL METHOD, AND PROGRAM

This application is a National Stage Entry of PCT/JP2018/019304 filed on May 18, 2018, which claims priority from Japanese Patent Application 2017-129221 filed on Jun. 30, 2017, the contents of all of which are incorporated herein by reference, in their entirety.

TECHNICAL FIELD

The present invention relates to image processing.

BACKGROUND ART

For example, the technology of Patent Document 1 is known as a method of tracking a person in a queue. In Patent Document 1, a method of arranging a camera on a ceiling such that the camera is directed to a space just below the camera, capturing an area such as a cashier where a queue can be formed, and determining whether or not each person captured by the camera is a person in the queue is disclosed. More specifically, in the technology of Patent Document 1, the area is set at a position where a queue can be formed, and a determination as to whether or not a person present in the area is included in the queue is performed based on queue behavior pattern parameters.

The queue behavior pattern parameters are parameters for determining whether or not the person captured by the camera is the person in the queue. The queue behavior pattern parameters include a slight movement parameter, a standstill parameter, a distance (proximity parameter) from the person at the tail of the queue, and distances (cut-in distance and separation distance parameters) from queue line segments for determining cutting in and leaving. In the technology of Patent Document 1, a determination as to whether or not each person is the person in the queue is performed using these parameters.

In a case where a certain person enters the set area, first, the state of the person is set to a state of "having a possibility of lining up in the queue". Furthermore, in a case where the person stands still in the area, the person is determined as lining up in the queue. A condition for determining that the person stands still is that the position of the person falls in a range of the "slight movement parameter", and the person stays in the range for a time period designated by the "standstill parameter". In a case where persons included in the queue are present, the states of persons within the proximity parameter from the person at the tail of the queue change to the state of "having a possibility of lining up in the queue". A determination as to whether or not those persons are added to the queue is performed using the same method.

A determination as to whether or not a certain person cuts in the queue is performed based on how close the person is to a line segment connecting the positions of the persons lining up in the queue as a reference. Similarly, a determination as to whether or not a certain person leaves the queue is performed based on how far the person is from the line segment connecting the positions of persons lining up in the queue as a reference. Thresholds of the distances used in the determinations are the cut-in distance and separation distance parameters.

RELATED DOCUMENT

Patent Document

[Patent Document 1] PCT Japanese Translation Patent Publication No. 2008-519567

SUMMARY OF THE INVENTION

Technical Problem

A part or the whole of the queue moves as time elapses. For example, the whole queue of persons lining up at a cashier in a supermarket moves forward one person at a time in a case where a person at the head of the queue finishes payment. In a case where a person leaves the queue, persons lining up behind the person move forward.

In the technology of Patent Document 1, each process above is performed on the assumption that the whole queue is stopped. That is, a technology for tracking a person in a state where the queue is moving is not disclosed in Recited Document 1.

The present invention is conceived in view of the above matters. An objective of the present invention is to provide a technology for accurately tracking an object included in a queue of objects.

Solution to Problem

An information processing apparatus of the present invention includes 1) a generation unit that detects a queue of objects from a video frame and generates tracking information indicating a position of each tracking target object, where each object included in the detected queue is the tracking target object, 2) a queue behavior estimation unit that estimates a behavior of the queue at a first time point and generates queue behavior information related to the behavior of the queue using the tracking information related to the tracking target object at the first time point, 3) an estimated position computation unit that computes an estimated position of each tracking target object at a second time point later than the first time point based on the tracking information and the queue behavior information at the first time point, and 4) an update unit that detects one or more objects from the video frame at the second time point and updates information of each tracking target object indicated in the tracking information based on a position of each detected object and the estimated position of each tracking target object at the second time point.

A control method of the present invention is a control method executed by a computer. The control method includes 1) a generation step of detecting a queue of objects from a video frame and generating tracking information indicating a position of each tracking target object, where each object included in the detected queue is the tracking target object, 2) a queue behavior estimation step of estimating a behavior of the queue at a first time point and generating queue behavior information related to the behavior of the queue using the tracking information related to the tracking target object at the first time point, 3) an estimated position computation step of computing an estimated position of each tracking target object at a second time point later than the first time point based on the tracking information and the queue behavior information at the first time point, and 4) an update step of detecting one or more objects from the video frame at the second time point and updating information of each tracking target object indicated in the tracking information based on a position of each detected object and the estimated position of each tracking target object at the second time point.

A program of the present invention causes a computer to execute each step of the control method of the present invention.

Advantageous Effects of Invention

According to the present invention, a technology for accurately tracking an object included in a queue of objects is provided.

BRIEF DESCRIPTION OF THE DRAWINGS

The above object and other objects, features, and advantages will become more apparent from exemplary example embodiments set forth below and the following drawings appended thereto.

FIG. 13 is a diagram for describing a method of associating the object detected from the video frame at the second time point with the tracking target object.

FIG. 14 is a diagram illustrating a case of performing high reliability association and then, decomposing a partial queue and performing subsequent association.

DESCRIPTION OF EMBODIMENTS

Hereinafter, example embodiments of the present invention will be described using the drawings. Note that in all of the drawings, the same constituents will be designated by the same reference signs, and descriptions of such constituents will not be repeated. In addition, in each block diagram, unless otherwise particularly described, each block does not represent a hardware unit configuration and represents a function unit configuration.

Example Embodiment 1

Summary

Figure 1:
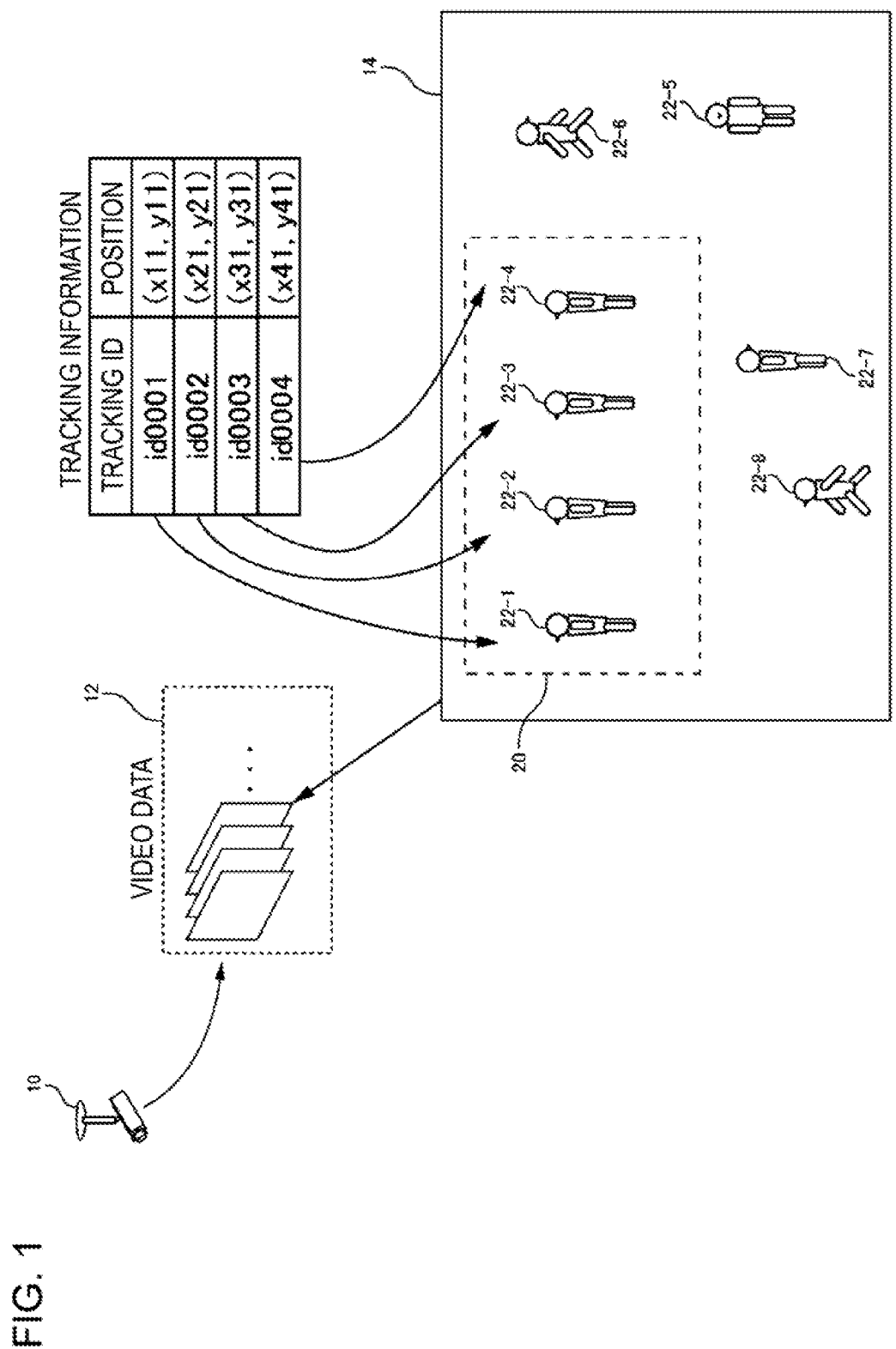
FIG. 1 is a diagram for describing a summary of operation of an information processing apparatus of Example Embodiment 1.

FIG. 1 is a diagram for describing a summary of operation of an information processing apparatus (information processing apparatus 2000 in FIG. 3 described below) of Example Embodiment 1. The operation of the information processing apparatus 2000 in the following description is an illustration for easy understanding of the information processing apparatus 2000. The operation of the information processing apparatus 2000 is not limited to the following example. Details and variations of the operation of the information processing apparatus 2000 will be described below.

The information processing apparatus 2000 detects an object queue 20 from video data 12 that is generated by a camera 10. The object queue 20 is a queue configured with objects 22. In FIG. 1, the object queue 20 is configured with an object 22-1 to an object 22-4 among the object 22-1 to an object 22-8 included in a video frame 14. The video frame 14 is one of time series captured images constituting the video data 12.

Any queue can be handled as the object queue 20. For example, the object queue 20 is a queue of persons waiting for using a cashier, a ticket vending machine, and the like. In this case, the objects 22 are persons. Besides, for example, the object queue 20 is a queue of vehicles waiting for using a parking lot. In this case, the objects 22 are vehicles. In FIG. 1, the objects 22 are persons.

The information processing apparatus 2000 generates tracking information using the objects 22 included in the object queue 20 as tracking target objects. The tracking information includes various information related to the tracking target objects and indicates at least the position of each tracking target object.

The information processing apparatus 2000 repeatedly updates the tracking information. The update of the tracking information includes at least an update of the position of each tracking target object. The information processing apparatus 2000 updates the tracking information considering the behavior of each object 22 and also the behavior of the object queue 20.

The behavior of the object 22 is represented by the state, the motion, and the like of the object 22. For example, the state of the object 22 is a state where the object 22 stands still or a state where the object 22 is moving. For example, the motion of the object 22 is represented by a direction and a speed at which the object 22 is moving.

On the other hand, the behavior of the object queue 20 is represented by the state, the motion, and the like of the object queue 20. For example, the state of the object queue 20 is a state where the whole object queue 20 stands still, a state where the whole object queue 20 is moving, or a state where a part of the object queue 20 is moving. For example, the motion of the object queue 20 is represented by a direction and a speed at which the object queue 20 is moving.

It is assumed that the information processing apparatus 2000 updates the tracking information at a first time point (tracking information related to the tracking target objects included in the object queue 20 at the first time point) to the tracking information at a second time point later than the first time point (refer to FIG. 2). The information processing apparatus 2000 estimates the behavior of the object queue 20 using the tracking information at the first time point and generates queue behavior information. The queue behavior information indicates the behavior of the object queue 20. Furthermore, the information processing apparatus 2000 estimates the position of each tracking target object at the second time point based on the tracking information at the first time point and the queue behavior information at the first time point (queue behavior information generated for the object queue 20 at the first time point). The information processing apparatus 2000 updates the tracking information based on the estimated position of each tracking target object at the second time point and the position of each object 22 detected from the video frame 14 at the second time point (video frame 14 representing the capturing result of the camera 10 at the second time point).

Figure 2:
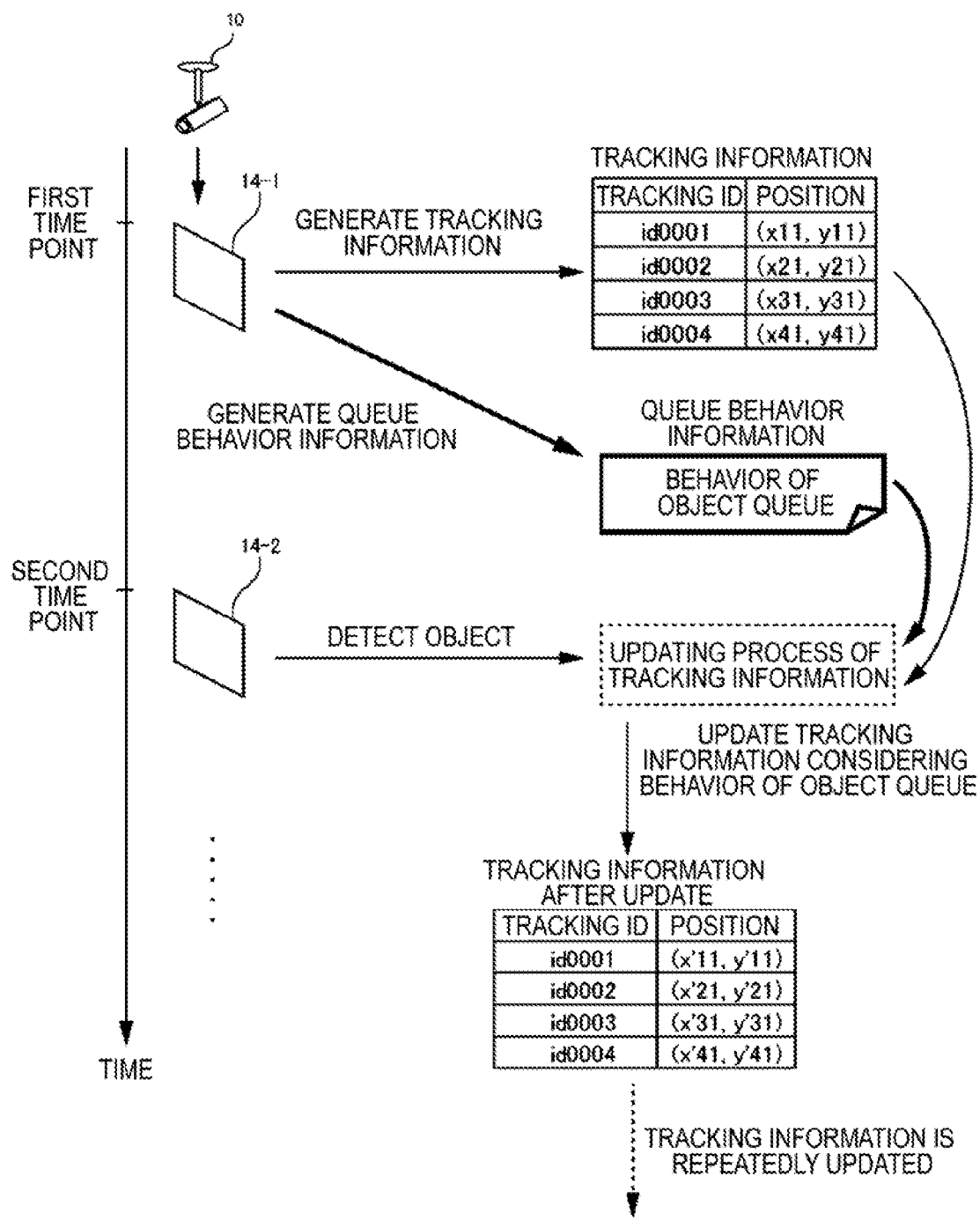
FIG. 2 is a diagram for describing a summary of operation of the information processing apparatus of Example Embodiment 1.

Note that in FIG. 2, the tracking information at the first time point is illustrated as being generated from the video frame 14 at the first time point. However, the tracking information at the first time point may be information updated from the tracking information in the past.

Advantageous Effect

The behavior of the object 22 included in the object queue 20 is affected by the behavior of the whole object queue 20. For example, even in a case where the object 22 stands still at a certain time point, there is a high likelihood that the object 22 starts moving immediately in a case where an object in front of the object 22 is moving forward at the time point. Similarly, even in a case where the object 22 is moving at a certain time point, there is a high likelihood that the object 22 stops immediately in a case where the object in front of the object 22 stands still at the time point.

Therefore, the information processing apparatus 2000 of the present example embodiment updates the tracking information at the first time point after considering the behavior of the object queue 20 at the first time point. Accordingly, the tracking information is updated after the effect of the behavior of the whole object queue 20 on each object 22 is considered. Thus, the update of the tracking information that is, tracking of the object included in the object queue 20, can be performed with higher accuracy.

Hereinafter, the information processing apparatus 2000 of the present example embodiment will be described in further detail.

<Example of Functional Configuration of Information Processing Apparatus 2000>

Figure 3:
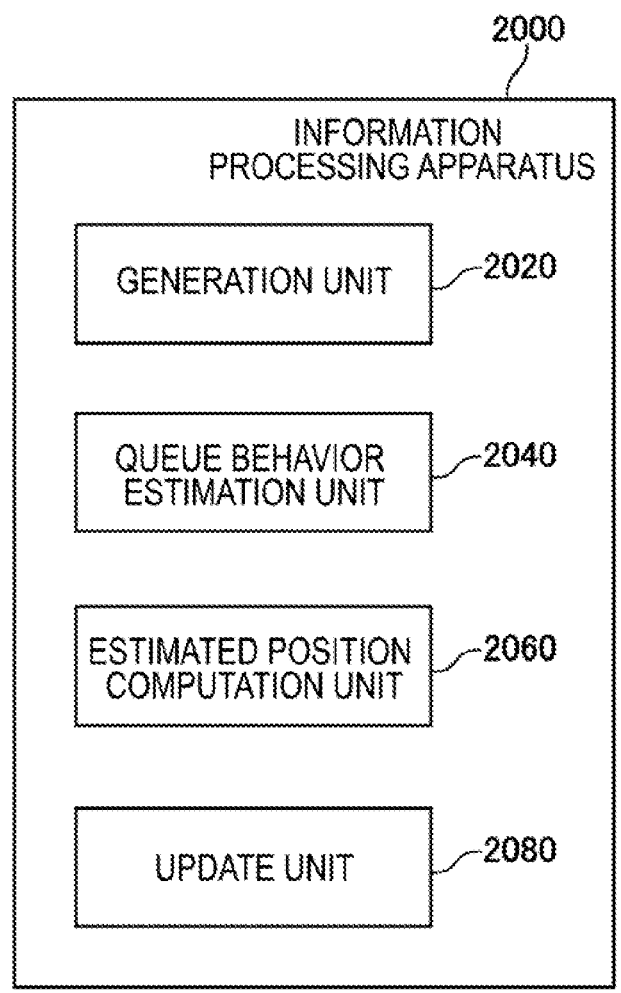
FIG. 3 is a diagram illustrating a configuration of the information processing apparatus of Example Embodiment 1.

FIG. 3 is a diagram illustrating a configuration of the information processing apparatus 2000 of Example Embodiment 1. For example, the information processing apparatus 2000 includes a generation unit 2020, a queue behavior estimation unit 2040, an estimated position computation unit 2060, and an update unit 2080. The generation unit 2020 detects the object queue 20 from the video frame 14 and generates the tracking information indicating the position of each tracking target object using each object 22 included in the object queue 20 as the tracking target object. The queue behavior estimation unit 2040 estimates the behavior of the object queue 20 at the first time point and generates the queue behavior information using the tracking information at the first time point. The estimated position computation unit 2060 computes the estimated position of each tracking target object at the second time point later than the first time point based on the tracking information at the first time point and the queue behavior information at the first time point.

The update unit 2080 detects one or more objects 22 from the video frame 14 at the second time point and updates the tracking information based on the position of each detected object 22 and the estimated position of each tracking target object at the second time point.

<Hardware Configuration of Information Processing Apparatus 2000>

Each functional configuration unit of the information processing apparatus 2000 may be implemented by hardware (example: a hardwired electronic circuit) implementing each functional configuration unit, or may be implemented by a combination of hardware and software (example: a combination of an electronic circuit and a program controlling the electronic circuit). Hereinafter, a case where each functional configuration unit of the information processing apparatus 2000 is implemented by a combination of hardware and software will be described.

Figure 4:
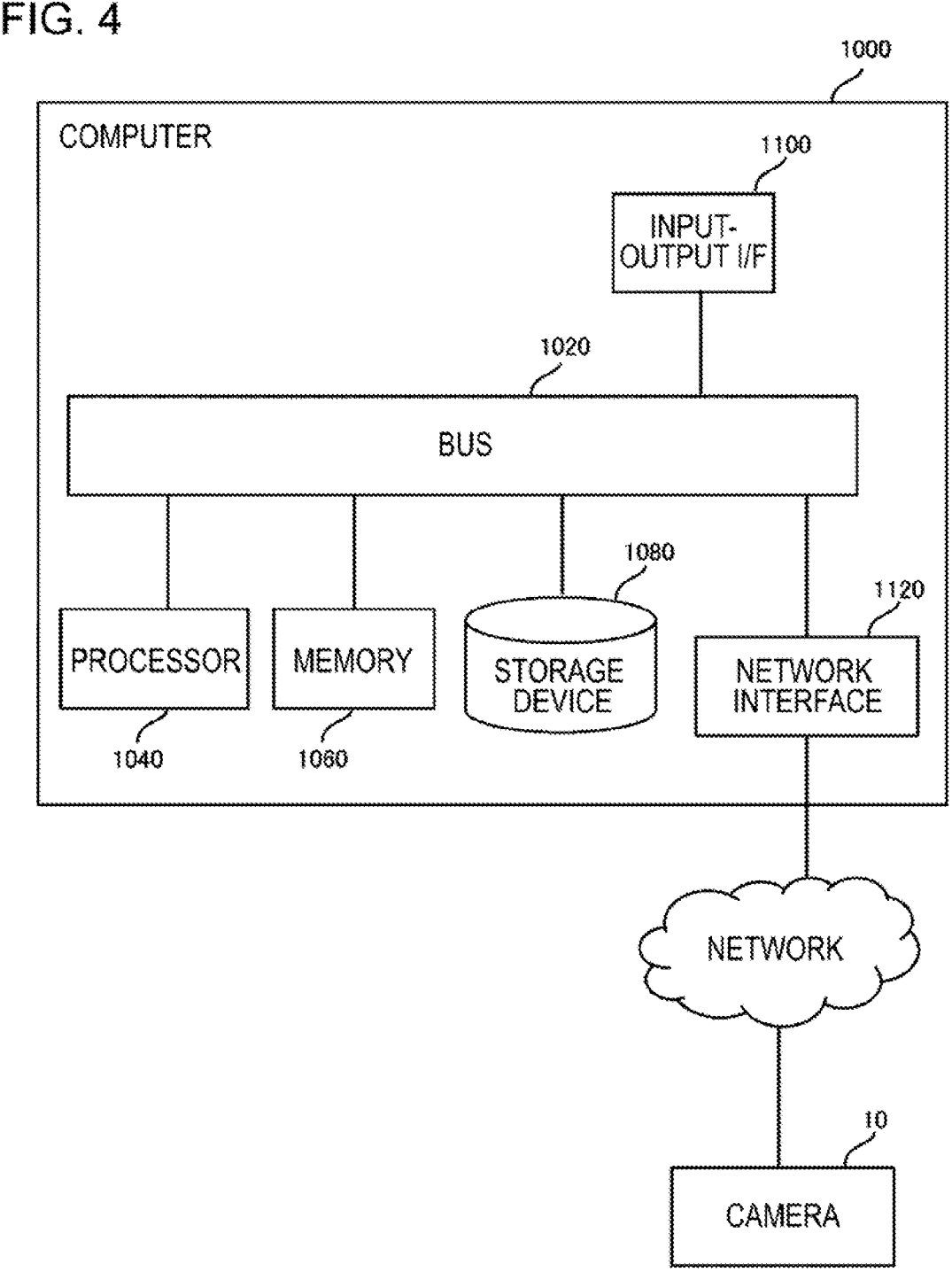
FIG. 4 is a diagram illustrating a computer for implementing the information processing apparatus.

FIG. 4 is a diagram illustrating a computer 1000 for implementing the information processing apparatus 2000. The computer 1000 is any computer. For example, the computer 1000 is a personal computer (PC), a server machine, a tablet terminal, or a smartphone. Besides, for example, the computer 1000 may be the camera 10. The computer 1000 may be a dedicated computer designed to implement the information processing apparatus 2000 or may be a general-purpose computer.

The computer 1000 includes a bus 1020, a processor 1040, a memory 1060, a storage device 1080, an input-output interface 1100, and a network interface 1120. The bus 1020 is a data transfer path for transmission and reception of data among the processor 1040, the memory 1060, the storage device 1080, the input-output interface 1100, and the network interface 1120. A method of connecting the processor 1040 and the like to each other is not limited to bus connection. The processor 1040 corresponds to various processors such as a central processing unit (CPU) and a graphics processing unit (GPU). The memory 1060 is a main storage apparatus that is implemented using a random access memory (RAM) or the like. The storage device 1080 is an auxiliary storage apparatus that is implemented using a hard disk, a solid state drive (SSD), a memory card, a read only memory (ROM), or the like. The storage device 1080 may be configured by the same hardware as hardware such as the RAM constituting the main storage apparatus.

The input-output interface 1100 is an interface for connecting the computer 1000 to input-output devices. The network interface 1120 is an interface for connecting the computer 1000 to a communication network. For example, the communication network is a local area network (LAN) or a wide area network (WAN). A method of connecting the network interface 1120 to the communication network may be wireless connection or may be wired connection.

For example, the computer 1000 is communicably connected to the camera 10 through the network. A method of communicably connecting the computer 1000 to the camera 10 is not limited to connection through the network. In addition, the computer 1000 may not be communicably connected to the camera 10.

The storage device 1080 stores a program module that implements each functional configuration unit (the generation unit 2020, the queue behavior estimation unit 2040, the estimated position computation unit 2060, and the update unit 2080) of the information processing apparatus 2000. The processor 1040 implements a function corresponding to each program module by reading each program module into the memory 1060 and executing the program module.

Note that the computer 1000 may be implemented using a plurality of computers. For example, each of the generation unit 2020, the queue behavior estimation unit 2040, the estimated position computation unit 2060, and the update unit 2080 can be implemented by a different computer. In this case, the program module stored in the storage device of each computer may be only a program module corresponding to the functional configuration unit implemented by the computer.

<Camera 10>

The camera 10 is any camera that generates the video data 12 by generating the video frame 14 in time series by repeatedly performing capturing. For example, the camera 10 is a surveillance camera that is installed for surveillance of a determined facility, road, and the like.

As described above, the computer 1000 implementing the information processing apparatus 2000 may be the camera 10. In this case, the camera 10 generates and updates the tracking information by analyzing the video frame 14 generated by the camera 10. As the camera 10 having such a function, for example, a camera called an intelligent camera, a network camera, or an Internet Protocol (IP) camera can be used.

Note that all functions of the information processing apparatus 2000 may not be implemented by the camera 10, and only a part of the functions of the information processing apparatus 2000 may be implemented by the camera 10. For example, only the function of detecting the object 22 from the video frame 14 is implemented by the camera 10, and the other functions of the information processing apparatus 2000 are implemented by a server apparatus. In this case, the server apparatus acquires various information such as the position and an image feature of the detected object 22 from the camera 10.

<Flow of Process>

Figure 5:
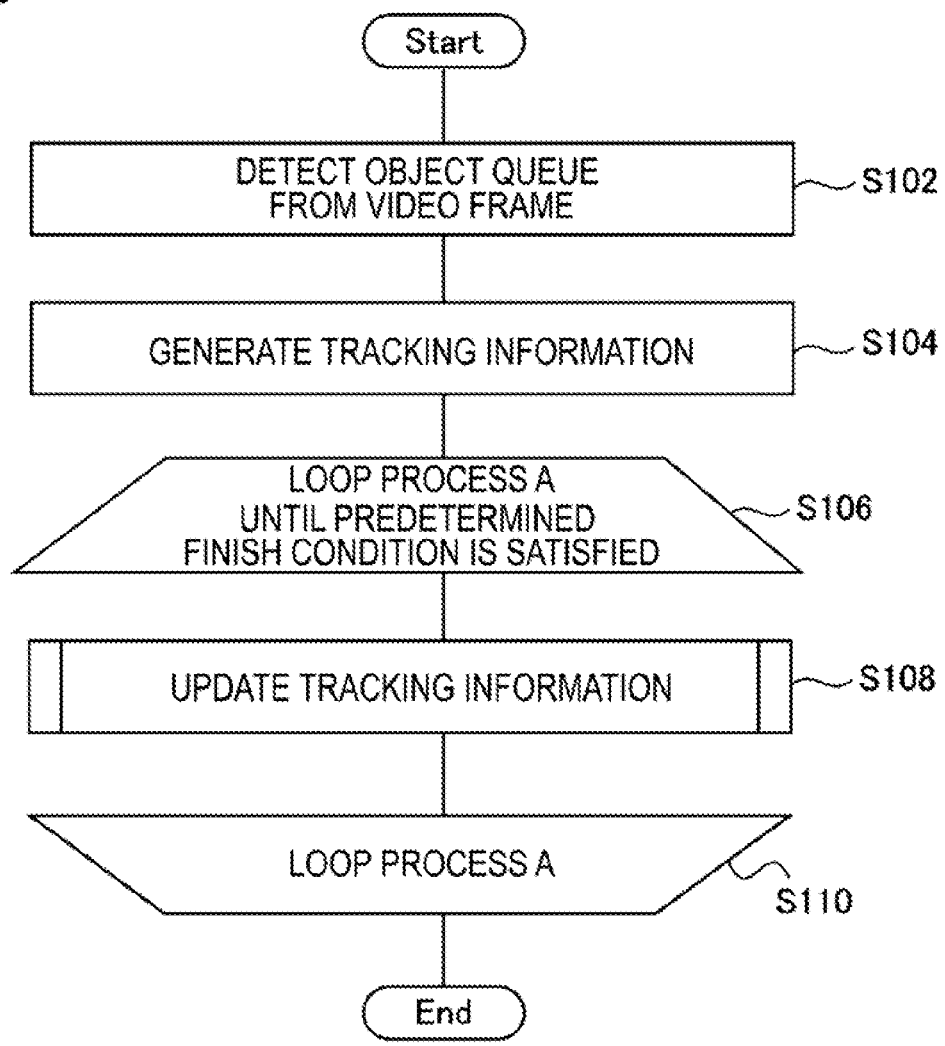
FIG. 5 is a flowchart illustrating a summary of a flow of process executed by the information processing apparatus of Example Embodiment 1.

FIG. 5 is a flowchart illustrating a summary of a flow of process executed by the information processing apparatus 2000 of Example Embodiment 1. The information processing apparatus 2000 detects the object queue 20 from the video frame 14 (S102). The information processing apparatus 2000 generates the tracking information, where the objects 22 included in the detected object queue 20 are the tracking target objects (S104).

S106 to S110 correspond to a loop process A that is repeatedly executed until a predetermined finish condition is satisfied. In S106, in a case where the predetermined finish condition is satisfied, the information processing apparatus 2000 finishes the process in FIG. 5. On the other hand, in a case where the predetermined finish condition is not satisfied, the process in FIG. 5 proceeds to S108. In S108, the information processing apparatus 2000 updates the tracking information. S110 is the end of the loop process. Thus, the process in FIG. 5 proceeds to S106. By repeatedly executing the loop process A until the predetermined finish condition is satisfied, the tracking information is repeatedly updated.

The predetermined finish condition is any condition. For example, the predetermined finish condition is that the number of objects 22 included in the object queue 20 is 0, that is, the object queue 20 is not present. In this case, the information processing apparatus 2000 executes the process in FIG. 5 again from the beginning for the video data 12 configured with the video frame 14 that is not set as a processing target yet. By doing so, detection of the newly formed object queue 20 and detection of a change of the object queue 20 are performed.

Figure 6:
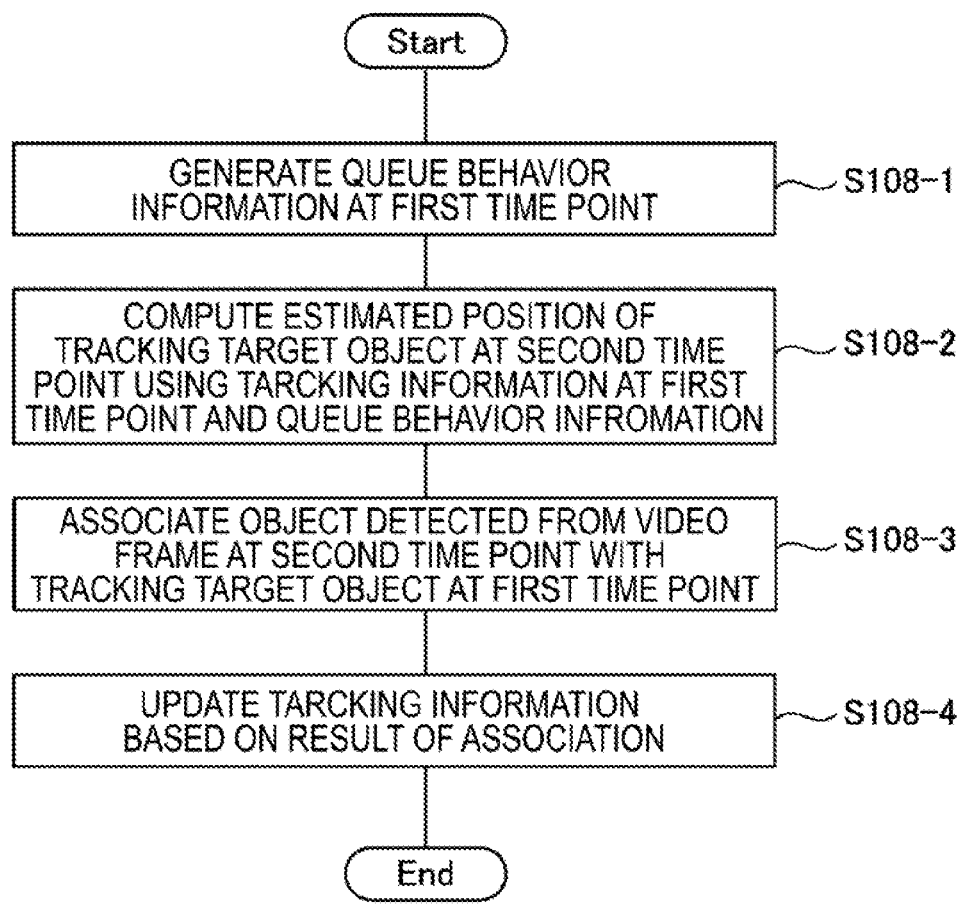
FIG. 6 is a flowchart illustrating a specific flow of process of S108.

FIG. 6 is a flowchart illustrating a specific flow of process of S108. The queue behavior estimation unit 2040 generates the queue behavior information using the tracking information at the first time point (S108-1). The estimated position computation unit 2060 computes the estimated position of the tracking target object at the second time point based on the tracking information at the first time point and the queue behavior information (S108-2). The update unit 2080 associates the object 22 detected from the video frame 14 at the second time point with the tracking target object at the first time point based on the estimated position of each tracking target object at the second time point and the position of each object 22 detected from the video frame 14 at the second time point (S108-3). The update unit 2080 updates the tracking information based on the result of association (S108-4).

Note that the series of processes illustrated in FIG. 6 are processes included in the loop process A and thus, are repeatedly executed. In each repeatedly executed loop process A, the first time point corresponds to a different time point. For example, the first time point in the (n+1)-th (n is a positive integer) loop process A is a time point acquired by adding a predetermined value to the first time point in the n-th loop process A. Besides, for example, the first time point in the (n+1)-th loop process A may be the same time point as the second time point in the n-th loop process A.

Similarly, in each repeatedly executed loop process A, the second time point corresponds to a different time point. For example, the second time point in the (n+1)-th loop process A is a time point acquired by adding a predetermined value to the second time point in the n-th loop process A.

<Method of Acquiring Video Frame 14>

The information processing apparatus 2000 acquires one or more video frames 14 as a processing target. Various methods of acquiring the video frame 14 by the information processing apparatus 2000 are present. For example, the information processing apparatus 2000 receives the video frame 14 transmitted from the camera 10. Alternatively, for example, the information processing apparatus 2000 accesses the camera 10 and acquires the video frame 14 stored in the camera 10.

Note that the camera 10 may store the video frame 14 in a storage apparatus that is installed outside the camera 10. In this case, the information processing apparatus 2000 acquires the video frame 14 by accessing the storage apparatus. Thus, in this case, the information processing apparatus 2000 and the camera 10 may not be communicably connected.

In a case where a part or all of the functions of the information processing apparatus 2000 are implemented by the camera 10, the information processing apparatus 2000 acquires the video frame 14 generated by the information processing apparatus 2000 itself. In this case, for example, the video frame 14 is stored in a storage apparatus (for example, the storage device 1080) inside the information processing apparatus 2000. Therefore, the information processing apparatus 2000 acquires the video frame 14 from the storage apparatus.

A timing at which the information processing apparatus 2000 acquires the video frame 14 is any timing. For example, each time a new video frame 14 constituting the video data 12 is generated by the camera 10, the information processing apparatus 2000 acquires the newly generated video frame 14. Besides, for example, the information processing apparatus 2000 may periodically acquire a non-acquired video frame 14. For example, in a case where the information processing apparatus 2000 acquires the video frame 14 once in one second, the information processing apparatus 2000 collectively acquires a plurality of video frames 14 (for example, 30 video frames 14 in a case where a frame rate of the video data 12 is 30 frames/second (fps)) that are generated in one second by the camera 10.

The information processing apparatus 2000 may acquire all video frames 14 constituting the video data 12 or may acquire only a part of the video frames 14. In the latter case, for example, the information processing apparatus 2000 acquires the video frames 14 generated by the camera 10 at a ratio of one to a predetermined number.

<Detection of Object Queue 20: S102>

The generation unit 2020 detects the object queue 20 from the video frame 14 (S102). In addition, as an assumption for the detection of the object queue 20, the generation unit 2020 detects the object 22 from the video frame 14. Various methods can be used as a method of detecting the object 22 from the video frame 14. For example, the generation unit 2020 includes a detector that learns the image feature of the object as a detection target. In a case where a person is handled as the object 22, the detector learns the image feature of a person. In a case where a vehicle is handled as the object 22, the detector learns the image feature of a vehicle.

The detector detects an image region matching the learned image feature from the video frame 14 as a region (hereinafter, an object region) representing the object. For example, a detector that performs detection based on a histograms of oriented gradients (HOG) feature or a detector that uses a convolutional neural network (CNN) can be used as the detector. Note that the detector may be learned to detect the region of the whole object or may be learned to detect a part of the region of the object (for example, a head portion of a person).

The detector outputs information (hereinafter, detection information) related to the detected object 22. For example, the detection information indicates the position and the size of each object 22. The position of the object 22 in the detection information may be represented as a position on the video frame 14 (for example, coordinates using the upper left corner of the video frame 14 as an origin) or may be represented as real world coordinates. Existing technologies can be used as a technology for computing the real world coordinates of an object included in an image generated by a camera. For example, the real world coordinates of the object 22 can be computed from the position of the object 22 on the video frame 14 using parameters representing a position and a pose acquired by calibrating the camera.

The detection information may include a feature value representing the appearance feature of each object 22. A feature value describing the size of the object, the color or the pattern of a surface (in the case of a person, the color or the pattern of clothes), or the like can be used as the feature value. More specifically, a feature value such as a color histogram, a color layout, an edge histogram, or a Gabor feature can be used. In addition, the detection information may include a feature value representing the shape of the object. For example, a shape descriptor standardized in MPEG-7 can be used as the feature value representing the shape of the object.

The generation unit 2020 detects a queue of the objects 22, that is, the object queue 20, detected from the video frame 14. Various existing technologies (for example, a technology disclosed in Patent Document 1) can be used as a technology for detecting a queue configured with objects detected from an image.

Figure 7:
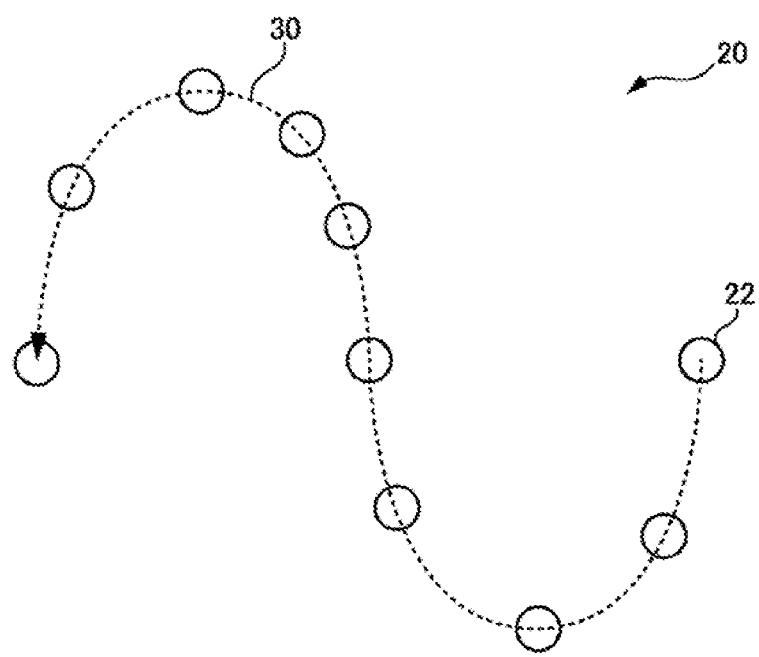
FIG. 7 is a diagram illustrating an object queue having a non-linear shape.

Note that the shape of the object queue 20 may be linear or may not be linear. The latter case is a case where the object queue 20 is curved in an S shape or is folded in the middle of the object queue 20. FIG. 7 is a diagram illustrating the object queue 20 having a non-linear shape. In a case where the shape of the object queue 20 is not linear, for example, a queue line 30 is defined along the object queue 20, and the state, the movement direction, and the like of the object queue 20 are defined along the queue line.

<Generation of Tracking Information: S104>

The generation unit 2020 generates the tracking information for the determined object queue 20 (S104). The tracking information at the first time point indicates information related to the tracking target object included in the object queue 20 at the first time point. The tracking information indicates at least the position of the tracking target object. Besides, for example, the tracking information indicates the state, the motion, the feature value, or the region of the tracking target object.

For example, the state of the tracking target object indicates either one of "movement" and "standstill". For example, the motion of the tracking target object indicates parameters of a motion model. For example, in a case where a motion model of a uniform linear motion is used as the motion model, the parameters of the motion model include the movement direction and the speed. For example, the feature value of the tracking target object is information in which the size, the color or the pattern, or the shape of the tracking target object is described. For example, the region of the tracking target object is represented by information (for example, the coordinates of the upper left corner and the lower right corner) that defines a circumscribed rectangle of the image region representing the tracking target object.

Figure 8:
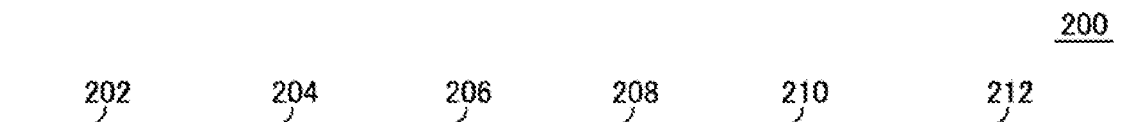
FIG. 8 is a diagram illustrating tracking information in a table format.

FIG. 8 is a diagram illustrating the tracking information in a table format. The table in FIG. 8 is referred to as a table 200. The table 200 shows a tracking ID 202, a position 204, a state 206, a motion 208, a feature value 210, and a region 212. The tracking ID 202 is an identifier assigned to the tracking target object. Note that TL and BR in the region 212 represent the coordinates of the upper left corner (top left) and the coordinates of the lower right corner (bottom right), respectively.

The tracking information generated by the generation unit 2020 is stored in a storage region. For example, the storage region is the storage device 1080 in FIG. 4. The storage region in which the tracking information is stored is not limited to the storage region installed inside the information processing apparatus 2000. For example, the tracking information may be stored in a storage region such as the server apparatus or a network attached storage (NAS) outside the information processing apparatus 2000. In this case, the generation unit 2020 transmits the generated tracking information to the server apparatus or the like.

<Generation of Queue Behavior Information: S108-1>

The queue behavior estimation unit 2040 generates the queue behavior information at the first time point using the tracking information at the first time point (S108-1). The queue behavior information is information related to the behavior of the object queue 20.

The "behavior of the object queue 20" means the state or the motion of the object queue 20. For example, the state of the object queue 20 represents whether the object queue 20 stands still or the object queue 20 is moving. The state of the object queue 20 may represent whether the whole object queue 20 is moving or a part of the object queue 20 is moving.

For example, three states including a standstill state, a whole movement state, and a partial movement state are defined as the state of the object queue 20. The standstill state is a state where the object queue 20 stands still. The whole movement state is a state where the whole object queue 20 is moving. The partial movement state is a state where a part of the object queue 20 is moving.

For example, the queue behavior information indicates any of the three states to which the state of the object queue 20 corresponds. In a case where the object queue 20 is in the whole movement state or the partial movement state, the queue behavior information may further indicate motion information of the object queue 20. For example, the motion information of the object queue 20 indicates the speed and the direction of the object queue 20. In a case where the object queue 20 is in the partial movement state, the queue behavior information indicates a part of the object queue 20 that is moving, and the motion information for each moving part.

Figure 9:
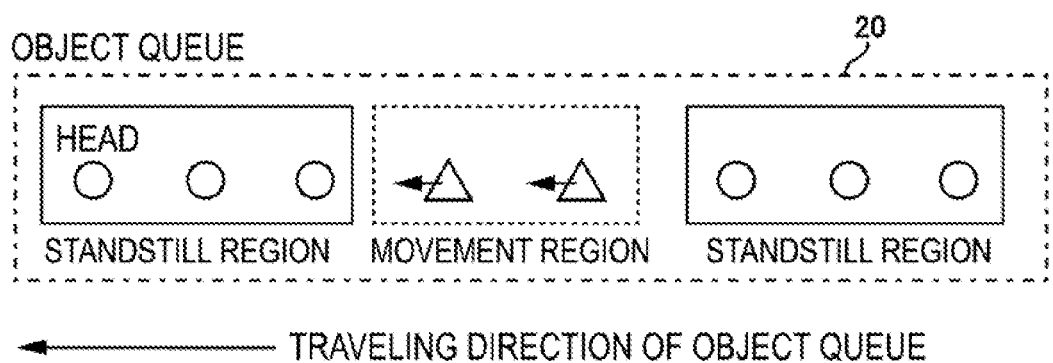
FIG. 9 is a diagram illustrating a behavior of the object queue in a partial movement state.

FIG. 9 is a diagram illustrating the behavior of the object queue 20 in the partial movement state. In FIG. 9, the head of the object queue 20 is on the left side, and the movement direction of the queue is the leftward direction. A circle mark represents the standstill object 22. A triangle mark represents the moving object 22.

In the partial movement state, as illustrated in FIG. 9, a part of the objects 22 moves in the traveling direction of the object queue 20, and the other objects stand still. Thus, the region of the object queue 20 is divided into a movement region (region of the moving object 22) and a standstill region (region of the standstill object 22). In FIG. 9, a region surrounded by a solid line represents the standstill region, and a region surrounded by a broken line represents the movement region.

For example, for the object queue 20 illustrated in FIG. 9, the queue behavior information indicates that the state of the object queue 20 is the partial movement state and indicates information determining each movement region or standstill region, the motion information of each movement region, and the like. For example, the information determining the movement region indicates the position of the movement region, information (identifier or the like assigned to the object 22) determining each object 22 included in the movement region, or the like. For example, the information determining the standstill region indicates the position of the standstill region, information determining each object 22 included in the standstill region, or the like.

The queue behavior estimation unit 2040 estimates the behavior or the object queue 20 based on the state of each object 22 indicated in the tracking information. Hereinafter, the estimation will be more specifically described.

For example, in a case where the state of each of all objects 22 indicated in the tracking information is the standstill state, the queue behavior estimation unit 2040 estimates that the state of the object queue 20 is the standstill state. In a case where the state of each of all objects 22 indicated in the tracking information is the movement state, the queue behavior estimation unit 2040 estimates that the state of the object queue 20 is the whole movement state. In a case where both the object 22 in the movement state and the object 22 in the standstill state are indicated in the tracking information, the queue behavior estimation unit 2040 estimates that the state of the object queue 20 is the partial movement state.

In a case where the state of the object queue 20 is the whole movement state, the queue behavior estimation unit 2040 estimates the motion of the object queue 20 and includes the motion information of the object queue 20 in the queue behavior information. For example, the queue behavior estimation unit 2040 estimates the speed and the movement direction of the object queue 20. Existing technologies can be used as a technology for estimating the speed and the movement direction of the object queue.

In a case where the state of the object queue 20 is the partial movement state, the queue behavior estimation unit 2040 divides the object queue 20 into the movement region in which the object 22 is moving and the standstill region in which the object 22 stands still. For example, the queue behavior estimation unit 2040 sets a region configured with a plurality of moving objects 22 adjacent to each other in the object queue 20 as the movement region. On the other hand, the queue behavior estimation unit 2040 sets a region configured with a plurality of standstill objects 22 adjacent to each other in the object queue 20 as the standstill region.

Furthermore, for the movement region, the queue behavior estimation unit 2040 generates the motion information of the movement region and includes the motion information in the queue behavior information. The technology for estimating the speed and the movement direction of the object queue can be used as a technology for estimating the motion (the speed and the movement direction) of the movement region.

It is assumed that the behavior of each tracking target object is indicated in the tracking information. In this case, a situation in which the behavior of each individual tracking target object is not consistent with the behavior of the whole object queue 20 may occur. For example, there is a case where a proceeding and a succeeding tracking target objects stand still while a tracking target object between them moves. For example, this case is a case where the state of the tracking target object is determined as the movement state due to occurrence of a small change in position of the tracking target object, which is caused by a change in pose or the like of the tracking target object.

In a case where the behavior of each individual tracking target object is not consistent with the behavior of the whole object queue 20, an estimation error of the behavior of the object queue 20 may be generated in a case where the behavior of the object queue 20 is estimated considering the behavior of each tracking target object independently of each other. For example, there is a possibility that the state of the object queue 20 in the standstill state is estimated as the partial movement state, or the state of the object queue 20 in the partial movement state is estimated as the whole movement state.

Therefore, the queue behavior estimation unit 2040 may not use the behavior of the tracking target object indicated in the tracking information and may correct the behavior of each tracking target object after considering consistency with the behaviors of other surrounding tracking target objects. Specifically, for the tracking target object being in the "movement state" indicated in the tracking information, in a case where both the state of another tracking target object positioned just ahead of the tracking target object and the state of another tracking target object positioned just behind the tracking target object are the "standstill state", the queue behavior estimation unit 2040 handles the state of the tracking target object as the "standstill state". Similarly, for the tracking target object being in the "standstill state" indicated in the tracking information, in a case where both the state of another tracking target object positioned just ahead of the tracking target object and the state of another tracking target object positioned just behind the tracking target object are the "movement state", the queue behavior estimation unit 2040 may handle the state of the tracking target object as the "movement state".

Besides, for example, the queue behavior estimation unit 2040 may correct the behavior of the tracking target object using the queue behavior information generated in the past (for example, the most recent queue behavior information generated before the first time point). For example, in a case where the state of the object queue 20 indicated in the most recent queue behavior information generated before the first time point is the standstill state, it is considered that the object queue 20 at the first time point is in a state where the whole object queue 20 remains in the standstill state, or the tracking target object close to the head starts moving. The state of the object queue 20 in the former case is the standstill state, and the state of the object queue 20 in the latter case is the partial movement state.

Therefore, for example, in a case where the most recent queue behavior information indicates the standstill state, the queue behavior estimation unit 2040 handles only the tracking target object near the head of the object queue 20 as being in the movement state among the tracking target objects being in the "movement state" indicated in the tracking information. In other words, the queue behavior estimation unit 2040 handles the tracking target object not positioned near the head of the object queue 20 as being in the standstill state among the tracking target objects being in the "movement state" indicated in the tracking information.

Besides, for example, in a case where the state of the object queue 20 indicated in the most recent queue behavior information is the partial movement state, there is a possibility that the tracking target object that is in the movement state and is positioned just behind the standstill region indicated in the behavior information subsequently stands still. In addition, there is a possibility that the tracking target object that is in the standstill state and is positioned just behind the movement region starts moving. For other tracking target objects, there is a high likelihood that those objects remain in the same state.

Therefore, in a case where the most recent queue behavior information indicates the partial movement state, and the state of the tracking target object positioned just behind the standstill region indicated in the most recent queue behavior information indicates the movement state in the tracking information at the first time point, the queue behavior estimation unit 2040 handles the state of the tracking target object as the standstill state. In a case where the most recent queue behavior information indicates the partial movement state, and the state of the tracking target object positioned just behind the movement region indicated in the most recent behavior information indicates the standstill state in the tracking information at the first time point, the queue behavior estimation unit 2040 handles the state of the tracking target object as the movement state.

As described above, by not necessarily using the behavior of the tracking target object indicated in the tracking information and by correcting and handling the state of the tracking target object considering the states of other tracking target objects and the most recent queue behavior information, the effect of an error of the tracking information related to the individual tracking target objects can be excluded. Thus, the accuracy of estimation of the behavior of the object queue 20 can be improved.

<Computation of Estimated Position of Tracking Target Object: S108-2>

The estimated position computation unit 2060 computes the estimated position of each tracking target object at the second time point based on the tracking information at the first time point and the queue behavior information at the first time point (S108-2). By using the tracking information and also the queue behavior information, the estimated position of the tracking target object is computed such that the behavior of the tracking target object is consistent with the behavior of the whole object queue 20.

Hereinafter, a method of computing the estimated position of the tracking target object by the estimated position computation unit 2060 will be specifically described.

It is assumed that the state of the object queue 20 indicated in the queue behavior information is the standstill state. In this case, the estimated position computation unit 2060 estimates that there is no change in position of the tracking target at the first time point and the second time point. That is, the estimated position computation unit 2060 sets the position of each tracking target object indicated in the tracking information at the first time point as the estimated position of each tracking target object at the second time point.

In a case where the state of the object queue 20 indicated in the queue behavior information is the partial movement state or the whole movement state, the estimated position computation unit 2060 computes the estimated position of the tracking target object at the second time point based on the behavior of the tracking target object indicated in the tracking information at the first time point. The behavior of the tracking target object at the first time point is indicated in the tracking information at the first time point. For example, in a case where the position and the motion of the tracking target object at a first time point t1 are represented by coordinates p1 and a velocity vector v, respectively, an estimated position p2 of the tracking target object at a second time point t2 is computed by Expression (1) below.

$$p2 = p1 + (t_2 - t_1)\vec{v} \qquad (1)$$

Note that the motion of the tracking target object at the first time point may not be indicated in the tracking information at the first time point. For example, in this case, the speed of the moving tracking target object is defined in advance as a fixed value, and the position of the tracking target object at the second time point is estimated based on the defined speed and the position of the tracking target object at the first time point. For example, it is assumed that the movement direction of the tracking target object is the same as the movement direction of the object queue 20 indicated in the queue behavior information.

It is assumed that the queue behavior information indicates the partial movement state. In this case, the estimated position computation unit 2060 computes the estimated position at the second time point using different methods for the tracking target objects included in the standstill region and the tracking target objects included in the movement region. Hereinafter, the methods will be specifically described.

Basically, it is considered that there is no change in position of the tracking target object included in the standstill region at the first time point and the second time point. In addition, it is considered that the tracking target object included in the movement region moves in accordance with the motion of the tracking target object at the first time point.

However, even in a case where the tracking target object positioned behind the movement region stands still at the first time point among the tracking target objects included in the standstill region, there is a possibility that the tracking target object starts moving after the first time point. Conversely, even in a case where the tracking target object positioned behind the standstill region is moving at the first time point among the tracking target objects included in the movement region, there is a possibility that the tracking target object stops after the first time point.

Figure 10:
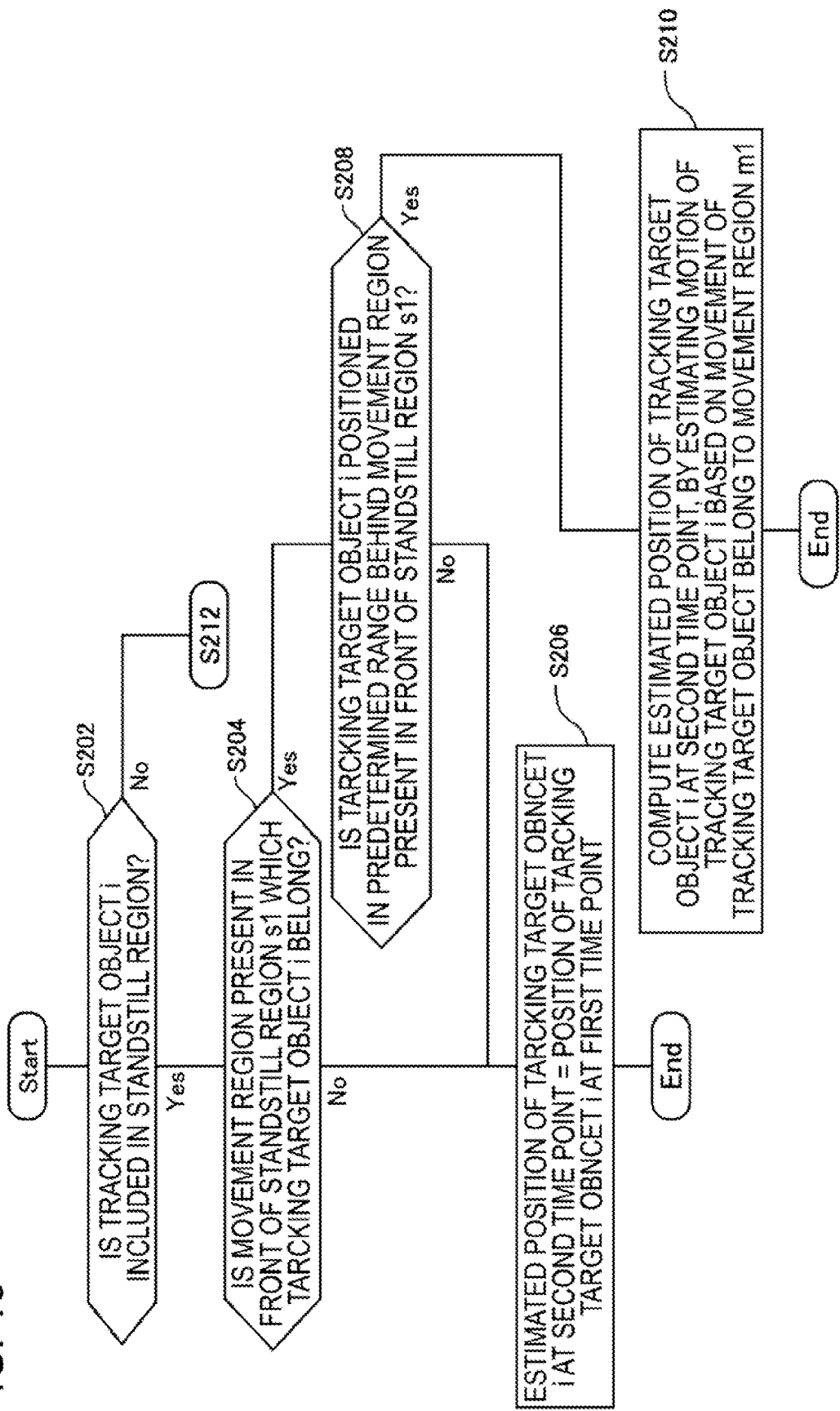
FIG. 10 is a first diagram illustrating a flow of process of computing an estimated position of each tracking target object in a case where queue behavior information indicates the partial movement state.
Figure 11:
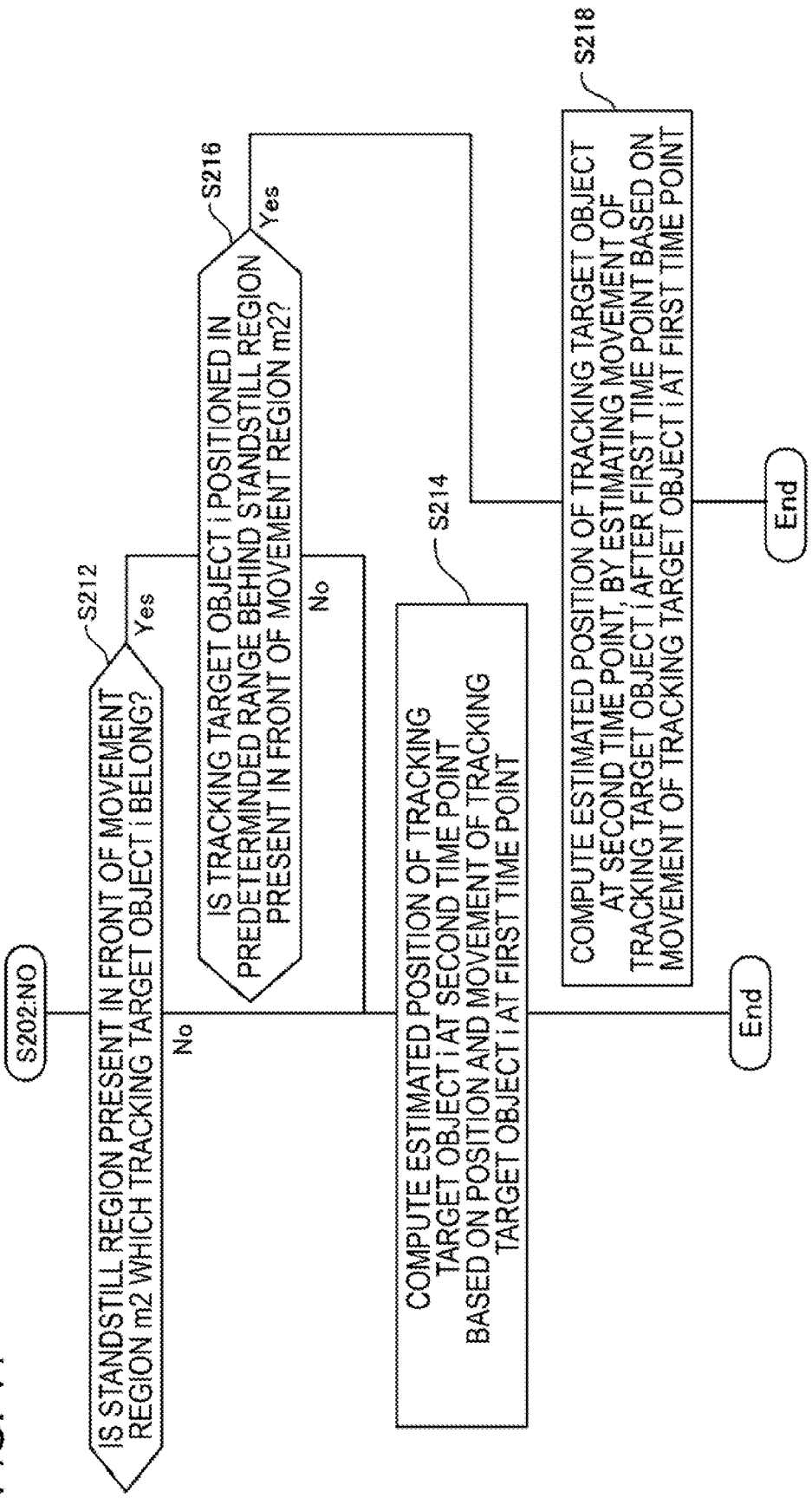
FIG. 11 is a second diagram illustrating the flow of process of computing the estimated position of each tracking target object in a case where the queue behavior information indicates the partial movement state.

Therefore, for example, the estimated position computation unit 2060 computes the estimated position of each tracking target object at the second time point based on a flow illustrated in the flowcharts in FIG. 10 and FIG. 11. FIG. 10 and FIG. 11 are diagrams illustrating a flow of process of computing the estimated position of each tracking target object in a case where the queue behavior information indicates the partial movement state. In FIG. 10 and FIG. 11, the estimated position is computed for a tracking target object i. Note that the flowcharts illustrated in FIG. 10 and FIG. 11 are performed for each tracking target object indicated in the tracking information at the first time point.

The estimated position computation unit 2060 determines whether or not the tracking target object i is included in the standstill region (S202). In a case where the tracking target object i is included in the standstill region (S202: YES), the estimated position computation unit 2060 determines whether or not the movement region is present in front of the standstill region (hereinafter, a standstill region s1) to which the tracking target object i belongs (S204). In a case where the movement region is not present in front of the standstill region s1 (S204: NO), the estimated position computation unit 2060 sets the position of the tracking target object at the first time point as the estimated position of the tracking target object i at the second time point (S206).

In a case where the movement region is present in front of the standstill region s1 (S204: YES), the estimated position computation unit 2060 determines whether or not the tracking target object i is positioned in a predetermined range behind the movement region (hereinafter, a movement region m1) present in front of the standstill region s1 (S208). In a case where the tracking target object i is not positioned in the predetermined range (S208: NO), the estimated position computation unit 2060 sets the position of the tracking target object at the first time point as the estimated position of the tracking target object i at the second time point (S206).

In a case where the tracking target object i is positioned in the predetermined range (S208: YES), the estimated position computation unit 2060 estimates the motion of the tracking target object i based on the motion of the tracking target objects belonging to the movement region m1, and computes the estimated position of the tracking target object i at the second time point based on the estimated motion (S210). A specific method of estimating the motion of the tracking target object i based on the motion of the tracking target objects belonging to the movement region m1 will be described below.

In S202, in a case where it is determined that the tracking target object i is not included in the standstill region (S202: NO), that is, in a case where the tracking target object i is included in the movement region, the estimated position computation unit 2060 determines whether or not the standstill region is present in front of the movement region (hereinafter, a movement region m2) to which the tracking target object i belongs (S212). In a case where the standstill region is not present in front of the movement region m2 (S212: NO), the estimated position computation unit 2060 computes the estimated position of the tracking target object i at the second time point based on the position and the motion of the tracking target object i at the first time point (S214). For example, this computation method is a method using Expression (1) above.

In a case where the standstill region is present in front of the movement region m2 (S212: YES), the estimated position computation unit 2060 determines whether or not the tracking target object i is positioned in a predetermined range behind the standstill region (hereinafter, a standstill region s2) present in front of the movement region m2 (S216). In a case where the tracking target object i is not positioned in the predetermined range (S216: NO), the estimated position computation unit 2060 computes the estimated position of the tracking target object i at the second time point based on the position and the motion of the tracking target object i at the first time point (S214).

In a case where the tracking target object i is positioned in the predetermined range (S216: YES), the estimated position computation unit 2060 estimates the motion of the tracking target object i after the first time point based on the motion of the tracking target object i indicated in the tracking information at the first time point, and computes the estimated position of the tracking target object i at the second time point based on the estimated motion (S218). The motion of the tracking target object i after the first time point is estimated as a motion smaller than the motion of the tracking target object i indicated in the tracking information at the first time point. Details of the estimation method will be described below.

<<Method of Estimating Motion of Tracking Target Object i in S210>>

As described above, in a case where the tracking target object i is positioned in the predetermined range behind the movement region m1 present in front of the standstill region s1 to which the tracking target object i belongs (S208: YES), the estimated position computation unit 2060 computes the estimated position of the tracking target object i at the second time point based on the position and the motion of the tracking target object i at the first time point (S210). For example, the estimated position computation unit 2060 estimates the motion of the tracking target object i based on the vector representing the motion of the tracking target object positioned at the tail of the movement region m1. For example, the estimated position computation unit 2060 estimates that the motion of the tracking target object i is represented by $\alpha v_0$ acquired by multiplying a velocity vector $v_0$ of the tracking target object positioned at the tail of the movement region m1 by a parameter $\alpha$ ($0 < \alpha \le 1$). In this case, the estimated position computation unit 2060 computes the estimated position p2 of the tracking target object i at the second time point using Expression (2) below.

$$p2 = p1 + (t_2 - t_1) \cdot \alpha \cdot \vec{v}_0 \quad (2)$$

The position of the tracking target object i at the first time point is denoted by p1. The first time point and the second time point are denoted by t1 and t2, respectively.

Various methods of setting the "predetermined range behind the movement region m1" are present. For example, a predetermined number from the head of the tracking target objects positioned behind the movement region is set as the "predetermined range behind the movement region m1". That is, the predetermined number of tracking target objects from the head of the tracking target objects positioned behind the movement region are handled as moving tracking target objects. Besides, for example, a range included in a predetermined distance from the tail of the movement region m1 is set as the "predetermined range behind the movement region m1".

Note that the parameter $\alpha$ used in the estimation of the motion of the tracking target object i may be a common value for all tracking target objects or may be a value different for each tracking target object. In the latter case, for example, the value of $\alpha$ is decreased as the tracking target object is positioned rearward.

<<Method of Estimating Motion of Tracking Target Object i in S218>>

As described above, in a case where the tracking target object i is positioned in the predetermined range behind the standstill region s2 present in front of the movement region m2 to which the tracking target object i belongs (S216: YES), the estimated position computation unit 2060 estimates the motion of the tracking target object i after the first time point based on the motion of the tracking target object i indicated in the tracking information at the first time point. For example, the estimated position computation unit 2060 estimates that the motion of the tracking target object i after the first time point is represented by $\beta v_i$ acquired by multiplying a velocity vector $v_i$ of the tracking target object at the first time point by a parameter $\beta$ ($0<\beta\leq1$). In this case, the estimated position computation unit 2060 computes the estimated position p2 of the tracking target object i at the second time point using Expression (3) below.

$$p2 = p1 + (t_2 - t_1) \cdot \beta \cdot \vec{v}_i \quad (3)$$

The position of the tracking target object at the first time point is denoted by p1. The first time point and the second time point are denoted by t1 and t2, respectively.

Note that the "predetermined range behind the standstill region s2" can be set using the same method as the "predetermined range behind the movement region m1".

In addition, the parameter $\beta$ used in the estimation of the motion of the tracking target object i may be a common value for all tracking target objects or may be a value different for each tracking target object. In the latter case, for example, the value of $\beta$ is decreased as the tracking target object is positioned forward.

Note that the estimated position computation unit 2060 may estimate the position of the tracking target object at the second time point and also the state and the likelihood of the tracking target object at the second time point and the motion of the tracking target object.

<Association Between Object 22 and Tracking Target Object: S108-3>

The update unit 2080 detects the object 22 from the video frame 14 of the second time point. In this detection, the same detector as the detector included in the generation unit 2020 can be used. The detector may be implemented in each of the generation unit 2020 and the update unit 2080 or may be implemented to be shared between the generation unit 2020 and the update unit 2080. Note that the detector used by the update unit 2080 may be configured to output only the detection information related to the object 22 estimated to be included in the object queue 20. Existing technologies can be used as a technology for estimating whether or not the object 22 is included in the object queue.

Figure 12:
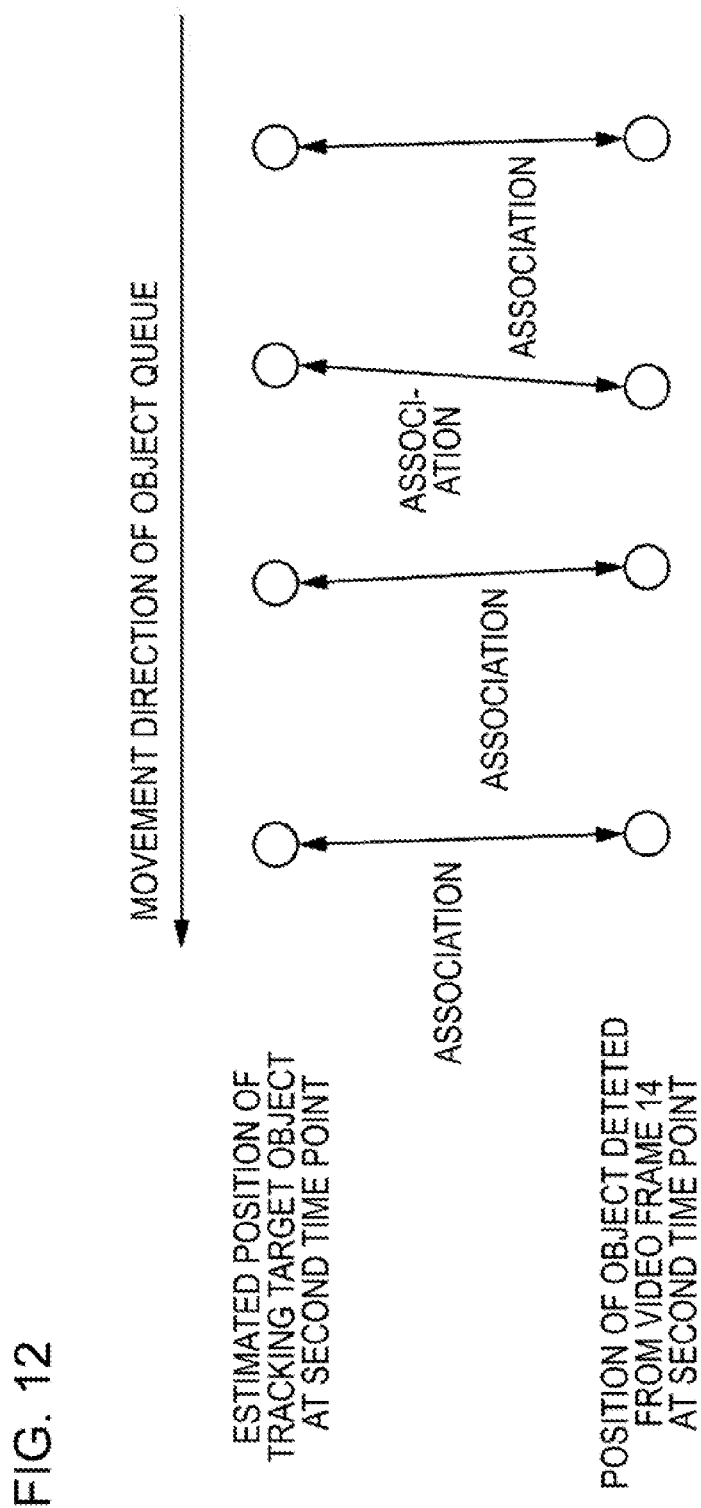
FIG. 12 is a diagram illustrating association between an object detected from a video frame at a second time point and a tracking target object of which the estimated position at the second time point is computed.

Furthermore, the update unit 2080 associates the object 22 detected from the video frame 14 at the second time point with the tracking target object based on the position of the object 22 detected from the video frame 14 at the second time point and the estimated position of each tracking target object at the second time point (S108-3). This association is a process of determining the tracking target object to which each object 22 detected from the video frame 14 of the second time point corresponds. FIG. 12 is a diagram illustrating association between the object 22 detected from the video frame 14 at the second time point and the tracking target object of which the estimated position at the second time point is computed. In FIG. 12, the object 22 and the tracking target object connected to each other by a bidirectional arrow are the object 22 and the tracking target object associated with each other.

Various methods of associating the object 22 detected from the video frame 14 at the second time point with the tracking target object of which the estimated position at the second time point is computed are present. For example, the update unit 2080 associates the object 22 detected at the closest position to the estimated position with the tracking target object of which the estimated position at the second time point is computed. Besides, for example, the update unit 2080 may perform the association using the following method.

FIG. 13 is a diagram for describing a method of associating the object 22 detected from the video frame 14 at the second time point with the tracking target object. Note that "non-detection" in FIG. 13 means that the object 22 to be associated with the tracking target object is not detected from the video frame 14 due to any reason (for example, the object is not detected from the video frame 14 due to an image noise). In addition, "erroneous detection" means that an object that does not actually present is detected due to any reason (for example, an image noise is detected as the object). Handling of the non-detection and the erroneous detection will be described below. The update unit 2080 preferentially performs the association for the tracking target object in the standstill state and then, performs the association for the tracking target object in the movement state. First, in a first step, the update unit 2080 performs the association for an anchor tracking target object. The anchor tracking target object is the tracking target object that almost does not move in the object queue 20 and is securely associated. That is, the anchor tracking target object is the tracking target object in the standstill state. The anchor tracking target object is associated with the object 22 whose distance to the estimated position of the tracking target object is less than or equal to a threshold among the objects 22 detected from the video frame 14. In FIG. 13, this association corresponds to association surrounded by a broken line ellipse.

Note that the queue behavior information may be further used in the association. For example, the tracking target object that is included in the standstill region but is just behind the movement region may not be handled as the anchor tracking target object.

Next, in a second step, the update unit 2080 divides the object queue 20 based on the association result of the anchor tracking target object. In the example in FIG. 12, the object queue 20 is divided into two partial queues surrounded by solid line rectangles. The update unit 2080 performs the association for each partial queue. That is, the association is performed between the tracking target object and the object 22 detected from the video frame 14 for each partial queue divided by the association of the anchor tracking target object. For example, a Hungarian method can be used as a method of association.

In the case of association based on a Hungarian method, for example, the likelihood of association between the tracking target object in the partial queue and the object 22 detected from the video frame 14 is acquired and is used by converting the likelihood into a cost by a monotonically non-increasing function. For example, the likelihood can be computed using the degree of overlapping between the circumscribed rectangle of the object 22 detected from the video frame 14 and the position and the circumscribed rectangle of the tracking target object whose position and size are adjusted by estimation. Besides, for example, the distance between the position of the object 22 detected from the video frame 14 and the estimated position of the tracking target object may be acquired and converted into a likelihood by the monotonically non-increasing function. The distance may be a distance on the image or may be a distance on the real world coordinates. In addition, in the computation of the likelihood, the state of the tracking target object may be considered. That is, a function or a parameter for acquiring the likelihood may be changed depending on whether the tracking target object is in the standstill state or the movement state. Accordingly, the likelihood in the standstill state can be acquired under a strict condition, and the likelihood in the movement state can be computed under a loose condition. Particularly, characteristics of each state such that an error in the distance between the estimated position of the tracking target object and the position (actual position) of the object detected from the video frame 14 is more likely to be generated in the case of the movement state than in the case of the standstill state can be reflected on the likelihood. In addition, a similarity between appearance features may be reflected on the likelihood. That is, a higher likelihood may be set between objects having more similar appearance features.

Alternatively, in the association of the partial queue in the second step, association whose reliability is considered to be high may be prioritized. For example, for the tracking target object in the movement state, in a case where the object 22 is detected from the video frame 14 at almost the same position as the estimated position of the tracking target object, the update unit 2080 may associate the tracking target object with the object 22. In addition, in a case where the tracking target object that is in the standstill state and is not selected as the anchor object can be associated with a certain object 22 detected from the video frame 14 under a slightly loose criterion, the update unit 2080 may associate the tracking target object with the object 22. In this case, the update unit 2080 divides the partial queue based on the result of association and then, performs the subsequent association.

FIG. 14 is a diagram illustrating a case of performing the high reliability association and then, decomposing the partial queue and performing the subsequent association in the second step. In the drawing, association surrounded by a broken line ellipse is the association of the object selected as the anchor, and association surrounded by a solid line ellipse is association preferentially performed for the tracking target object that is not selected as the anchor and is in the standstill state because it is determined that the reliability is high. After the association, the remaining objects are divided into partial queues. Association is performed for the partial queues using a Hungarian method or the like in the same manner as in the second step.

By considering the characteristics of the queue and prioritizing the association of the object for which the reliability of association is considered to be high, the accuracy of association can be increased. In addition, by dividing into partial queues, the number of cases of association to be reviewed is significantly decreased, and a calculation cost is also decreased.

Note that the same can be performed in a non-stepwise manner unlike the above description. For example, in the case of employing a method of collectively associating the whole using a Hungarian method, the object regarded as the anchor can be securely associated in a case where the cost of association of the object regarded as the anchor is set to be lower than the cost of other association. Thus, the accuracy of association can be increased.

<Update of Tracking Information: S108-4>

The update unit 2080 updates information of the tracking target object indicated in the tracking information based on the result of association (S108-4). That is, the tracking information at the first time point is updated to the tracking information at the second time point. The update of the tracking information may be performed by storing the tracking information at the second time point in the storage region without deleting the tracking information at the first time point from the storage region, or may be performed by overwriting the storage region storing the tracking information at the first time point with the tracking information at the second time point. In the former case, a history of the tracking information is accumulated in the storage region. On the other hand, in the latter case, the history of the tracking information is not accumulated, and only the most recent tracking information is stored in the storage region at all times.

For example, the content of the tracking information updated by the update unit 2080 is the position, the feature value, the motion, or the state of the tracking target object. Hereinafter, a method of updating each information will be described.

<<Update of Position of Tracking Target Object>>

The update unit 2080 updates the position (position 204 in the table 200) of the tracking target object based on the position of the object 22 associated with the tracking target object. For example, the update unit 2080 updates the position 204 of the tracking information to the position of the object 22 associated with the tracking target object. Besides, for example, the update unit 2080 performs a statistical process (for example, weighted addition) on the estimated position of the tracking target object at the second time point and the position of the object 22 associated with the tracking target object, and updates the position 204 of the tracking information to the position acquired as a result of the statistical process.

<<Update of Motion of Tracking Target Object>>

The update unit 2080 updates the motion (motion 208 in the table 200) of the tracking target object based on the difference between the position (hereinafter, an updated position) of the tracking target object after the update and the estimated position of the tracking target object estimated by the estimated position computation unit 2060. By doing so, the motion of the tracking target object is corrected considering the degree of error in the estimation performed by the estimated position computation unit 2060.

Various methods of updating the motion 208 of the tracking target object are present. For example, it is assumed that the motion of the tracking target object is a uniform linear motion, and the motion 208 of the tracking information indicates the velocity vector of the tracking target object. In this case, the update unit 2080 updates the motion 208 of the tracking information by adding a value acquired by dividing a difference vector between the estimated position and the updated position by the difference in time between the second time point and the first time point (time interval between the second time point and the first time point) to the velocity vector of the tracking target object indicated in the motion 208 of the tracking information at the first time point.

Besides, for example, it is assumed that the motion of the tracking target object is defined using a Kalman filter. In this case, the motion 208 of the tracking information is included in a state variable of the Kalman filter. The update unit 2080 updates the state variable of the Kalman filter by applying the estimated position and the updated position to an update expression for the state variable of the Kalman filter. Known update expressions can be used as the update expression for the state variable of the Kalman filter.

<<Update of State of Tracking Target Object>>

The update unit 2080 updates the state (state 206 in the table 200) of the tracking target object. For example, in a case where the magnitude (speed) of the velocity of the updated tracking target object is less than or equal to a predetermined value (for example, 0), the update unit 2080 updates the state 206 of the tracking target object to the standstill state. On the other hand, in a case where the magnitude of the velocity of the updated tracking target object is greater than the predetermined value, the update unit 2080 updates the state 206 of the tracking target object to the movement state.

<<Update of Feature Value of Tracking Target Object>>

The update unit 2080 updates the feature value (feature value 210 in the table 200) of the tracking target object associated with the object 22 based on the feature value of the object 22 detected from the video frame 14 at the second time point. For example, the update unit 2080 performs a statistical process (for example, weighted addition) on the feature value of the object 22 and the feature value that is indicated in the feature value 210 of the tracking information for the tracking target object associated with the object 22, and updates the feature value 210 of the tracking target object indicated in the tracking information using the feature value acquired as a result of the statistical process. Besides, for example, the update unit 2080 may replace the feature value 210 indicated in the tracking information for the tracking target object associated with the object 22 with the feature value of the object 22. Besides, for example, in a case where the tracking information indicates a plurality of feature values for one tracking target object (for example, in a case where a plurality of templates are stored), the update unit 2080 may replace a part of the feature value 210 of the tracking target object indicated in the tracking information with the feature value of the object 22 associated with the tracking target object.

<<Update of Region of Tracking Target Object>>

The update unit 2080 updates the region (region 212 in the table 200) of the tracking target object indicated in the tracking information. For example, the update unit 2080 updates the region 212 of the tracking information by moving the region 212 of the tracking target object indicated in the tracking information depending on a change in position of the tracking target object. Besides, for example, the update unit 2080 may replace the region 212 indicated in the tracking information for the tracking target object associated with the object 22 with the region (for example, the circumscribed rectangle) of the object 22 detected from the video frame 14 at the second time point.

<<Addition, Deletion, and Like of Tracking Target Object>>

It is assumed that the tracking target object that is not associated with the object 22 detected from the video frame 14 at the second time point is present among the tracking target objects indicated in the tracking information at the first time point (case of the non-detection). This case means that the object 22 corresponding to the tracking target object is not detected from the video frame 14 at the second time point due to any reason. For example, in a case where the camera 10 is installed such that the camera 10 is directed to the object from above, other objects may be obstructed by an object close to the camera 10.

In a case where the tracking target object not associated with the object 22 detected from the video frame 14 at the second time point is present among the tracking target objects indicated in the tracking information at the first time point, the update unit 2080 updates the position of the tracking target object indicated in the tracking information to the estimated position of the tracking target object computed by the estimated position computation unit 2060.

In addition, it is assumed that the object 22 not associated with the tracking target object is present among the objects 22 detected from the video frame 14 at the second time point. This case includes 1) a case (hereinafter, a case of new joining) where the object 22 that is newly added to the object queue 20 is detected, and 2) a case (hereinafter, a case of the erroneous detection) where an object that is not the object 22 is erroneously detected as the object 22. Therefore, in a case where the object 22 not associated with the tracking target object is present among the objects 22 detected from the video frame 14 at the second time point, the update unit 2080 determines whether such a case is the case of the new joining or the case of the erroneous detection. In the case of the new joining, the update unit 2080 adds the object 22 not associated with the tracking target object to the tracking information at the second time point as a new tracking target object. On the on the other hand, in the case of the erroneous detection, the update unit 2080 does not add the object 22 not associated with the tracking target object to the tracking information at the second time point.

Various methods of determining the case of the new joining and the case of the erroneous detection are present. For example, in a case where the image region of the video frame 14 at the second time point representing the object 22 not associated with the tracking target object significantly overlaps with the image region of the existing tracking target object, the update unit 2080 determines that such a case is the case of the erroneous detection. Besides, for example, in a case where the object 22 not associated with any tracking target object is present between the preceding and succeeding objects 22 due to the structure of the object queue 20 even in a case where the preceding and succeeding objects 22 are exactly associated with the tracking target objects, the update unit 2080 may determine that such a case is the case of the erroneous detection regardless of whether or not the image region of the object 22 overlaps with the image region of the existing tracking target object. Note that in a case where a case is not determined as the case of the erroneous detection, the update unit 2080 determines that such a case is the case of the new joining.

Note that the update unit 2080 may determine whether or not the object 22 not associated with the tracking target object is the object constituting the object queue from the result of object detection performed on the video frame 14. In a case where this case is determined as the case of the new joining, and it is determined that the object 22 is the object constituting the object queue, the update unit 2080 adds the object 22 to the tracking information as a new tracking target object. On the other hand, in a case where the case is determined as the case of the new joining, and it is determined that the object 22 is not the object constituting the object queue, the update unit 2080 does not add the object 22 to the tracking information. Note that existing technologies can be used as a technology for determining whether or not each object detected from the video frame constitutes the object queue.

An object that leaves the object queue 20 may be present among the tracking target objects. Therefore, for example, the update unit 2080 deletes the tracking target object leaving the object queue 20 from the tracking information (does not include the leaving tracking target object in the tracking information at the second time point). Existing methods can be used in the determination as to whether or not the tracking target object leaves the object queue 20. For example, it is assumed that the object queue 20 is a queue that objects sequentially leave from the head of the queue. In this case, the image region of the video frame 14 that is handled as the head of the object queue 20 is set in advance. For the tracking target object positioned at the head of the object queue 20 at the first time point, in a case where the position of the object 22 associated with the tracking target object in the video frame 14 is outside the image region handled as the head, the update unit 2080 determines that the tracking target object leaves the object queue 20. Thus, the update unit 2080 deletes the tracking target object from the tracking information.

While the example embodiment of the present invention is described with reference to the drawings, the example embodiment is an illustration of the present invention. Various configurations other than those described above can be employed.

A part or the whole of the example embodiment may be described as in the following appendix but is not limited thereto.

1. An information processing apparatus including a generation unit that detects a queue of objects from a video frame and generates tracking information indicating a position of each tracking target object using each object included in the detected queue as the tracking target object, a queue behavior estimation unit that estimates a behavior of the queue at a first time point and generates queue behavior information related to the behavior of the queue using the tracking information related to the tracking target object at the first time point, an estimated position computation unit that computes an estimated position of each tracking target object at a second time point later than the first time point based on the tracking information and the queue behavior information at the first time point, and an update unit that detects one or more objects from the video frame at the second time point and updates information of each tracking target object indicated in the tracking information based on a position of each detected object and the estimated position of each tracking target object at the second time point.

2. The information processing apparatus according to 1, in which the update unit updates the tracking information related to the tracking target object by associating the tracking target object of which the position at the second time point is estimated with the object detected from the video frame at the second time point.

3. The information processing apparatus according to 1 or 2, in which the queue behavior estimation unit estimates one of a standstill state where all tracking target objects stand still, a whole movement state where all tracking target objects are moving, and a partial movement state where a part of the tracking target objects is moving as a state of the queue and generates the queue behavior information indicating the estimated state of the queue.

4. The information processing apparatus according to 3, in which in a case where the state of the queue is the partial movement state, the queue behavior estimation unit includes information for identifying a movement region in which the tracking target object is moving and a standstill region in which the tracking target object stands still in the queue behavior information.

5. The information processing apparatus according to 4, in which the estimated position computation unit computes the estimated position of the tracking target object by estimating that the tracking target object that is positioned in a predetermined range behind the movement region and is in the standstill state is moving.

6. The information processing apparatus according to 5, in which the estimated position computation unit estimates a magnitude of a motion of the tracking target object which is positioned in the predetermined range behind the movement region and is in the standstill state based on a magnitude of a motion of the movement region or a magnitude of a motion of the tracking target object included in the movement region.

7. The information processing apparatus according to any one of 4 to 6, in which the estimated position computation unit computes the position of the tracking target object by estimating that a motion of the tracking target object that is positioned in a predetermined range behind the standstill region and is in the movement state is smaller than a magnitude of a motion indicated in the tracking information.

8. The information processing apparatus according to any one of 1 to 7, in which the update unit preferentially associates the tracking target object in the standstill state among the tracking target objects.

9. A control method executed by a computer, including a generation step of detecting a queue of objects from a video frame and generating tracking information indicating a position of each tracking target object using each object included in the detected queue as the tracking target object, a queue behavior estimation step of estimating a behavior of the queue at a first time point and generating queue behavior information related to the behavior of the queue using the tracking information related to the tracking target object at the first time point, an estimated position computation step of computing an estimated position of each tracking target object at a second time point later than the first time point based on the tracking information and the queue behavior information at the first time point, and an update step of detecting one or more objects from the video frame at the second time point and updating information of each tracking target object indicated in the tracking information based on a position of each detected object and the estimated position of each tracking target object at the second time point.

10. The control method according to 9, in which in the update step, the tracking information related to the tracking target object is updated by associating the tracking target object of which the position at the second time point is estimated with the object detected from the video frame at the second time point.

11. The control method according to 9 or 10, in which in the queue behavior estimation step, one of a standstill state where all tracking target objects stand still, a whole movement state where all tracking target objects are moving, and a partial movement state where a part of the tracking target objects is moving is estimated as a state of the queue, and the queue behavior information indicating the estimated state of the queue is generated.

12. The control method according to 11, in which in the queue behavior estimation step, in a case where the state of the queue is the partial movement state, information for identifying a movement region in which the tracking target object is moving and a standstill region in which the tracking target object stands still is included in the queue behavior information.

13. The control method according to 12, in which in the estimated position computation step, the estimated position of the tracking target object is computed by estimating that the tracking target object that is positioned in a predetermined range behind the movement region and is in the standstill state is moving.

14. The control method according to 13, in which in the estimated position computation step, a magnitude of a motion of the tracking target object which is positioned in the predetermined range behind the movement region and is in the standstill state is estimated based on a magnitude of a motion of the movement region or a magnitude of a motion of the tracking target object included in the movement region.

15. The control method according to any one of 12 to 14, in which in the estimated position computation step, the position of the tracking target object is computed by estimating that a motion of the tracking target object that is positioned in a predetermined range behind the standstill region and is in the movement state is smaller than a magnitude of a motion indicated in the tracking information.

16. The control method according to any one of 9 to 15, in which in the update step, the tracking target object in the standstill state is preferentially associated among the tracking target objects.

17. A program causing a computer to implement each step of the control method according to any one of 9 to 16.

This application claims the benefit of priority from Japanese Patent Application No. 2017-129221 filed on Jun. 30, 2017, the entire disclosure of which is incorporated herein.

What is claimed is:

1. An information processing apparatus comprising:
    a memory storing one or more instructions; and
    one or more processors configured to execute the one or more instruction to implement:
        a generation unit that detects a queue of objects from a video frame, generates, when there is no past tracking information, tracking information indicating a position of each tracking target object based on positions of the objects detected in the video frame and generates, when there is past tracking information, the tracking information by updating the past tracking information to include information on movement of each tracking target object based on positions of the objects in the past tracking information and the positions of the objects detected in the video frame, wherein each object included in the detected queue is handled as the tracking target object;
        a queue behavior estimation unit that estimates, as a behavior of the queue, a movement of the queue at a first time point, and generates queue behavior information related to the movement of the queue using the tracking information related to the tracking target object at the first time point;
        an estimated position computation unit that computes an estimated position of each tracking target object at a second time point later than the first time point based on the position and the movement of each tracking target object indicated by the tracking information at the first time point and the movement of the queue indicated by the queue behavior information at the first time point; and
        an update unit that detects one or more objects from the video frame at the second time point and updates information of each tracking target object indicated in the tracking information based on a position of each detected object and the estimated position of each tracking target object at the second time point.

2. The information processing apparatus according to claim 1,
    wherein the update unit updates the tracking information related to the tracking target object by associating the tracking target object whose position at the second time point is estimated with the object detected from the video frame at the second time point.

3. The information processing apparatus according to claim 1,
    wherein the queue behavior estimation unit estimates one of a standstill state where all tracking target objects stand still, a whole movement state where all tracking target objects are moving, and a partial movement state where a part of the tracking target objects is moving as a state of the queue and generates the queue behavior information indicating the estimated state of the queue.

4. The information processing apparatus according to claim 3,
    wherein in a case where the state of the queue is the partial movement state, the queue behavior estimation unit includes information for identifying a movement region in which the tracking target object is moving and a standstill region in which the tracking target object stands still in the queue behavior information.

5. The information processing apparatus according to claim 4,
    wherein the estimated position computation unit computes the estimated position of the tracking target object by estimating that the tracking target object that is positioned in a predetermined range behind the movement region and is in the standstill state will move.

6. The information processing apparatus according to claim 5,
    wherein the estimated position computation unit estimates a magnitude of a motion of the tracking target object which is positioned in the predetermined range behind the movement region and is in the standstill state based on a magnitude of a motion of the movement region or a magnitude of a motion of the tracking target object included in the movement region.

7. The information processing apparatus according to claim 4,
    wherein the estimated position computation unit computes the position of the tracking target object by estimating that a motion of the tracking target object that is positioned in a predetermined range behind the standstill region and is in the movement state is smaller than a magnitude of a motion indicated in the tracking information.

8. The information processing apparatus according to claim 1,
    wherein the update unit preferentially associates the tracking target object in the standstill state among the tracking target objects.

9. A computer-implemented control method comprising:
    detecting a queue of objects from a video frame, generating when there is no past tracking information, tracking information indicating a position of each tracking target object based on positions of the objects detected in the video frame and generating, when there is past tracking information, the tracking information by updating the past tracking information to include information on movement of each tracking target object based on positions of the objects in the past tracking information and the positions of the objects detected in the video frame, wherein each object included in the detected queue is handled as the tracking target object;
    estimating, as a behavior of the queue, a movement of the queue at a first time point and generating queue behavior information related to the movement of the queue using the tracking information related to the tracking target object at the first time point;

computing an estimated position of each tracking target object at a second time point later than the first time point based on the position and the movement of each tracking target object indicated by the tracking information at the first time point and the movement of the queue indicated by the queue behavior information at the first time point; and detecting one or more objects from the video frame at the second time point and updating information of each tracking target object indicated in the tracking information based on a position of each detected object and the estimated position of each tracking target object at the second time point.

10. The control method according to claim 9,
wherein the tracking information related to the tracking target object is updated by associating the tracking target object whose the position at the second time point is estimated with the object detected from the video frame at the second time point.

11. The control method according to claim 9,
wherein one of a standstill state where all tracking target objects stand still, a whole movement state where all tracking target objects are moving, and a partial movement state where a part of the tracking target objects is moving is estimated as a state of the queue, and the queue behavior information indicating the estimated state of the queue is generated.

12. The control method according to claim 11,
wherein in a case where the state of the queue is the partial movement state, information for identifying a movement region in which the tracking target object is moving and a standstill region in which the tracking target object stands still is included in the queue behavior information.

13. The control method according to claim 12,
wherein the estimated position of the tracking target object is computed by estimating that the tracking target object that is positioned in a predetermined range behind the movement region and is in the standstill state will move.

14. The control method according to claim 13,
wherein a magnitude of a motion of the tracking target object which is positioned in the predetermined range behind the movement region and is in the standstill state is estimated based on a magnitude of a motion of the movement region or a magnitude of a motion of the tracking target object included in the movement region.

15. The control method according to claim 12,
wherein the position of the tracking target object is computed by estimating that a motion of the tracking target object that is positioned in a predetermined range behind the standstill region and is in the movement state is smaller than a magnitude of a motion indicated in the tracking information.

16. The control method according to claim 9,
wherein the tracking target object in the standstill state is preferentially associated among the tracking target objects.

17. A non-transitory computer-readable medium storing a program causing a computer to execute the control method according to claim 9.

* * * * *